United States Patent [19]
Azuma

[11] Patent Number: 5,806,246
[45] Date of Patent: *Sep. 15, 1998

[54] POWERED SLIDING-DOOR SYSTEM AND ACTUATING DEVICES FOR THE SAME

[75] Inventor: Chiharu Azuma, Hyogo-ken, Japan

[73] Assignee: Nippon Cable System Inc., Hyogo-ken, Japan

[*] Notice: This patent issued on a continued prosecution application filed under 37 CFR 1.53(d), and is subject to the twenty year patent term provisions of 35 U.S.C. 154(a)(2).

[21] Appl. No.: 587,743

[22] Filed: Jan. 19, 1996

[30] Foreign Application Priority Data

Feb. 28, 1995 [JP] Japan .................................. 7-066879
Feb. 28, 1995 [JP] Japan .................................. 7-066880

[51] Int. Cl.⁶ ............................................................ E05F 11/00
[52] U.S. Cl. ............................................................ 49/360
[58] Field of Search ...................................... 49/360, 361

[56] References Cited

U.S. PATENT DOCUMENTS

| | | | |
|---|---|---|---|
| 4,932,715 | 6/1990 | Kramer | 49/360 X |
| 5,046,283 | 9/1991 | Compeau et al. | 49/360 X |
| 5,168,666 | 12/1992 | Koura et al. | 49/360 |
| 5,233,789 | 8/1993 | Priest et al. | 49/360 |
| 5,319,881 | 6/1994 | Kuhlman | 49/360 |
| 5,551,190 | 9/1996 | Yamagishi et al. | 49/360 |

FOREIGN PATENT DOCUMENTS

| | | |
|---|---|---|
| 57-134730 | 8/1982 | Japan . |
| 60-41399 | 12/1985 | Japan . |
| 3-109918 | 11/1991 | Japan . |
| 5-61432 | 9/1993 | Japan . |
| 7-310766 | 11/1995 | Japan . |
| 8-177878 | 7/1996 | Japan . |

Primary Examiner—Jerry Redman
Attorney, Agent, or Firm—McDermott, Will & Emery

[57] ABSTRACT

A powered sliding-door system of an automobile with a sliding-door drive device A and an automatic door closer B. The sliding-door drive device A has a case body 1 opening downward, a case cover 2 covering the opening of the case body 1. A pair of guide pulleys are rotatably supported by axes, and each axis stands on the front end and the rear end of the case in slanting posture. A loop of cable is arranged between the pair of guide pulleys so that a working side is arranged outside of the case body and a return side is arranged in the case body. The loop of cable is driven by an motor driven actuator 12.

7 Claims, 21 Drawing Sheets

POWERED SLIDING-DOOR SYSTEM AND ACTUATING DEVICES FOR THE SAME

FIELD OF THE INVENTION

The present invention relates to a powered sliding-door system and actuating devices for the same, and more particularly, to a powered sliding-door system which provides remote control of a sliding-door with electric motors through control cables (Bowden cables), of what is called van type or wagon type of automobile.

Further, the present invention relates to a sliding-door drive device and an automatic sliding-door closer which are operated through control cables. The automatic sliding-door closer is a device to completely closing of sliding door which is slightly ajar by forcibly operating a latch in the sliding-door, to a fully latch position, and moreover to unlocking the latch from the fully latch position.

BACKGROUND OF THE RELATED ART

When a sliding-door is closed, the door is drawn back to the inner side of the automobile such that the door does not project from the outer surface of the side panel of body. And when the door is opened, the door is lifted or floated from the side panel first. Then the door is moved in the rear direction. In order to realize such motion of the door, the side panel is generally provided with two or three guide rails, and the door is provided with inward extending arms and guide rollers which roll along the guide rails such that the door can move along a predetermined route.

As the above-mentioned powered sliding-door system, Japanese Examined Utility Model Publication No.41399/1985 discloses a basic system. In the sliding-door system of No.41399/1985, in order to realize a lateral motion of the door, that is to say, a motion to float the door from the body side and to sink into the body, a relatively large loop of cable is arranged in a rectangular form by means of deflecting pulleys. And the loop is arranged at right angle with respect to a motion plane. Those pulleys and cable are housed and attached under the floor of the body. Another apparatus shown in Japanese Examined Patent Publication No.61432/1993, has a loop of cable a part of which extends along a guide rail for guiding the door, and another part of the cable is inserted into a flexible guide tubes or conduits at outer area of the guide rail. Therefore, the loop of cable can be realized without deflecting pulleys and tension pulleys.

Beside, some known sliding-door systems have an automatic door closer for operating a latch to a fully latch position, since it is not economic to shut the door to a fully latch position by means of the same slide-door drive device with strong force. For example, Japanese Unexamined Utility Model Publication No.109918/1991 discloses an automatic door closer which has a cable actuator and a door locking part connected to the cable actuator through a control cable or Bowden cable. This automatic door closer is housed in the sliding door. The locking part has a latch which is forcibly operated from a half latch position to a fully latch position by pulling an inner cable of the control cable with the cable actuator.

Beside, Japanese Examined Patent Publication No.61432/1993 discloses an opener which has a lever to release engagement of a claw from a latch in the door locking part, an electrically powered actuator, and two connecting rods. The actuator is a device for operating the lever through the connecting rods so as to disengage a claw or pole. That is to say, the lever allows the latch to return from a fully latch position to a latch-release position or open position. Those opener does not require long stroke, but requires large operation force. Therefore, the opener should have a reduction gear having large reduction ratio and a power transmitting means capable of transmitting large force. Therefore, for example, an electromagnetic or solenoid actuator is employed as the actuator, and some rods are employed as a power transmitting means.

The apparatus of the Utility Model Publication No.41399/1985 occupies large space, since several pulleys for forming a loop of cable are attached under the body of automobile. Further, the apparatus is not easily attached to the body, and regulation is troublesome.

Beside, the apparatus of Pat. Publication No.61432/1993 can be compactly assembled, since any pulley such as deflecting pulley or tension pulley is not employed. However, since conduits, an electric motor and a reduction gear are separately attached to a body of the automobile, the apparatus is not easily assembled. Further, the inner cable is not easily arranged along the guide rail, and tension of the cable is not easily regulated.

Further, a sliding-door is required to be thin, since the sliding-door sinks in the side panel at closed position and is floated from the side panel and slid rearward so that the door runs on the side panel at opened position. The arrangement of cable and wiring are required to be simple.

However, the above-mentioned sliding-door system which includes, an automatic door closer having a cable-actuator and a door locking part, and a door opener having a rod-actuator, connecting rods and the like, occupies large space in a sliding-door. Further, the cable arrangement and wiring are complicated.

SUMMARY OF THE INVENTION

An object of the present invention is to provide a powered sliding-door system which does not occupy large space, and can be easily attached to an automobile body and can be easily regulated.

Further another object of the present invention is to join the opener to an automatic door closer, and to provide a new cable type automatic door close which can function also as an opener so that the cable arrangement and wiring become more simple and easy, without enlarging the size of the door.

Further another object of the invention is to provide a cable actuator and a door locking device for the new automatic door closer.

According to the present invention, there is provided a sliding-door drive device which comprises a base plate extending in a door slide direction, a pair of guide elements to turn a cable direction such that the turned cable is shifted up or down, a loop of cable arranged between the pair of guide elements such that an upper portion of the cable is connected to the door, and an electrically powered actuator to drive the loop of the cable in the both directions.

In the above-mentioned device, the actuator is preferably attached to an under surface of the base plate, and the lower portion of the cable is preferably arranged under the base plate. Further, the under surface of the base plate is preferably covered with a cover member so as to form a box capable of housing the actuator and the lower portion of the cable. One of the guide elements might be laterally sifted toward the inside of a doorframe to guide the sliding-door with respect to another guide element. Further, at least one of the guide elements is preferably a guide pulley which rotates around an axis inclined to the base plate. Further, a part of the pulley is preferably projected upward from the upper surface of the base plate, and another part of the pulley is preferably projected downward from the lower surface of the base plate. Further, the above-mentioned electrically powered actuator might comprise an electric motor, a reduction gear, a drum for winding and rewinding the cable and a two-way clutch interposed between the reduction gear and the drum.

In the above-mentioned device, a loop of cable is arranged between the front guide element and the rear guide element. And a portion of the cable, namely a working side, is extended at the upper side of the base plate, and another portion of the cable, namely a return side or driving side, is extended at the lower side of the base plate. Therefore, when the base plate is attached to the under surface of the body of automobile, the upper side of the cable loop can be easily connected to the sliding-door.

In such state that the sliding-door drive device is attached to the automobile body, by actuating the loop of the cable in the go-and-return direction by means of the actuator, the door slides as the upper portion of the cable moves. In this situation, a connected portion of the door such as an arm does not interfere with the lower portion of the cable. Further, the working side of the loop of the cable can come close to or cross with the driving side in a plan view. Therefore, the device unit can be designed to have a small size.

By arranging the working side and the return side of the loop of cable on the upper side and the lower side of the base plate, respectively the upper and lower portions can be separated clearly. In this case, when a cover is put on a opening at the lower face of the base plate so that the obtained box can house the actuator and the return side of the cable, those actuator and return side of the cable can be securely protected.

The guide element is preferably a guide pulley which is rotatable around an inclined axis. In this embodiment, frictional loss due to the turn of the cable is small.

Further, in an embodiment where the working side and the return side are separated with the base plate, a portion of the pulley is projected upward and exposed from the base plate, and another portion of the pulley is housed in a box made of the base plate and the cover, the cable and the another portion of the pulley are covered and protected safely. Further, the attaching of the device to the automobile body is not obstructed by the return side of the cable.

When a two-way-clutch is interposed between the motor and the drum for winding the cable in the actuator, a rotational torque in both directions is securely transmitted from the motor to the drum. On the contrary, the torque in both directions can not be transmitted from the drum to the motor, and the drum runs idle. Therefore, the user can manually operate the door without obstruction by a reduction gear, for example, from outside of the automobile. Further, since electromagnetic clutch is not used, electric power of a battery can be saved.

When electric parts, such as limit switches, attached on the base plate are connected with a controller of the door by means of a junction type connector is used in the connection, the unitalization of the sliding-door driving device can be further advanced.

In the powered sliding-door system of the present invention, a loop of cable functions as a power transmission element for opening and closing the door along a predetermined route. And the working side of the loop of cable which moves together with the door is arranged at the upper side, and the return side of loop which moves in the opposite direction to the door motion is arranged at the lower side so as to sift up and down. Therefore, the width of the cable arrangement space is reduced. Particularly, when the both sides of the cable are crossed three-dimensionally, the width of the device can be reduced to about the same dimension as the lateral motion of the door, that is, in the lateral direction of the automobile.

Further, since the working side of the cable arranged at the upper side is connected to the door, the device can be easily attached to the body and the door.

According to the present invention, there is further provided a cable actuator of an automatic sliding-door closer comprising (a) a first cable for operating a close lever, (b) a first pulley for winding the first cable, (c) a second cable for operating an open lever, (d) a second pulley for winding the second cable, (e) a middle drum which engages with the first pulley to wind up the first cable when the middle drum rotates a first direction, and which engages with the second pulley to wind up the second cable when the middle drum rotates in a second direction, (f) a means for rotating the middle drum in both directions selectively.

In a preferable case, the first pulley, the second pulley and the middle drum are co-axially arranged. Further, in more preferable case, the middle drum is provided with a first engaging portion and a second engaging portion, the first pulley is provided with a first abutting portion to be abutted against the first engaging portion, and the second pulley is provided with a second abutting portion to be abutted against the second engaging portion. Further, in a preferable case, the middle drum has a cylindrical boss and a partition plate which has the first engaging portion and the second engaging portion so that the both engaging portions face opposite sides. The first pulley and the second pulley are rotatably mounted on the boss such that partition plate is put between the first pulley and the second pulley.

According to the present invention, there is further provided a door locking device comprising a housing, a bracket projecting from a rear face of the housing, a latch rotatably mounted on the housing so that the latch can rotate to a fully latch position, a half latch position and an open position, a return spring for urging the latch toward the open position, a close lever for operating the latch from the half latch position to the fully latch position, a claw for allowing the latch to rotate in a direction toward the fully latch position, but restricting the latch in the fully latch position by means of another return spring, an open lever for releasing the restriction of the latch, and a first cable to operate the close lever and a second cable to operate the open lever. The close lever and the open lever are rotatably mounted on the bracket, and the claw is rotatably mounted on the housing. The lever-ratio of the open lever is preferably in a range between 2/5 to 7/10.

Further, according to the present invention, there is provided an automatic door closer having only one of the above-mentioned cable actuators any one of the above-mentioned door locking devices, the first cable and the second cable. The cables are arranged between the cable actuator and the door locking device, and are slidably guided with flexible or bendable conduits. Both ends of the conduits are connected to the housing or bracket of the cable actuator and the door locking devices.

In the above-mentioned cable actuator, when the driving means in a neutral position is rotated in a direction, the middle drum also rotates in a direction. Then the first pulley rotates in the same direction, and the first cable is wrapped around the first pulley. In this situation, the second pulley does not rotate. And the first cable alone is pulled, and the closing lever is operated. When the driving means is rotated in the opposite direction from this situation, the close lever returns to the neutral position.

Beside, when the rotating means in the neutral position is rotated in another direction, the middle drum also rotates in the another direction to rotate the second pulley. The second cable is therefore wrapped around the second pulley to operate the open lever. In this situation, the first pulley does not rotate and the close lever is not operated. From this situation, when the driving means is rotated in opposite direction, the open lever returns to the neutral position.

In this cable actuator of the present invention, as mentioned above, two levers having different functions can be alternatively actuated by means of single driving means such as a motor and a reduction gear. Therefore, since only one driving mean is required, space in the door is saved, and wiring and cable arrangement are easy.

When the first pulley, the second pulley and the middle drum are arranged in co-axial state, the cable actuator becomes compact, and the co-operation among the middle drum and pulleys becomes easy. The above-mentioned co-axial construction can be realized by a construction in which a drum provided with first and second engaging portions, a first pulley provided with an abutting portion to be abutted against the first engaging portion, and a second pulley provided with another abutting portion to be abutted with the second engaging portion. Beside, when the first pulley and the second pulley are mounted on both end of a boss of the drum so that the two pulleys are arranged on the opposite sides of the separation plate, the middle drum and the first pulley or the second pulley can rotate as one body. In addition, the first cable and the second cable can be securely separated from each other.

In the above-mentioned door locking device of the present invention, when the close lever is operated by pulling the first cable, the latch rotates to the fully latch position against the return spring. Then, the claw allows the latch to rotate, and as the latch comes to the fully latch position, and the claw returns by the return spring and restricts the latch at the fully latch position. In this situation, even if the close lever is returned by losing the first cable, the fully latch state is kept. In this condition, when the open lever is operated by pulling the first cable, the claw is operated against the return spring, and the latch rotates to the open position by virtue of the return spring.

When lever-ratio of 2 to 3/2 is employed for the closing lever, operation transmitting power can be reduced. Therefore, a second cable having a small diameter as the first cable can be employed.

Further, even if conduits of the first cable and the second cable are combined as one cable, they can be easily arranged in the door, or the like.

The automatic door closer can be easily attached to the inside of the door, since the automatic door closer can be treated as a unit. Further, some sensors for detecting work condition can be used in common, and an electric control circuit for the devices can be simplified.

DETAILED DESCRIPTION OF THE PREFERRED EMBODIMENT

Figure 10C:
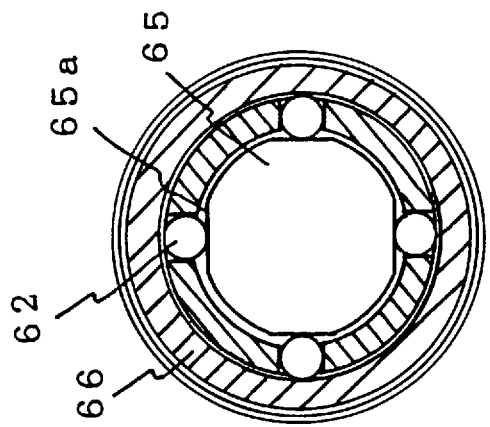
FIGS. 10a–c are sectional views showing another example of two-way-clutch adapted to the sliding-door drive device of the present invention.
Figure 10B:
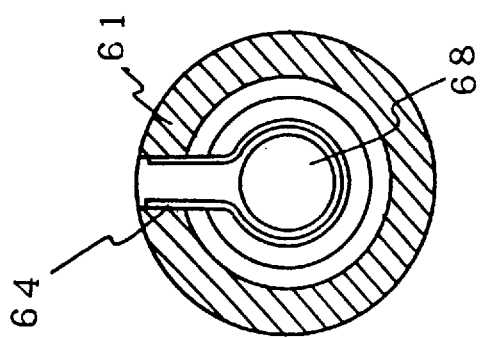
Figure 10A:
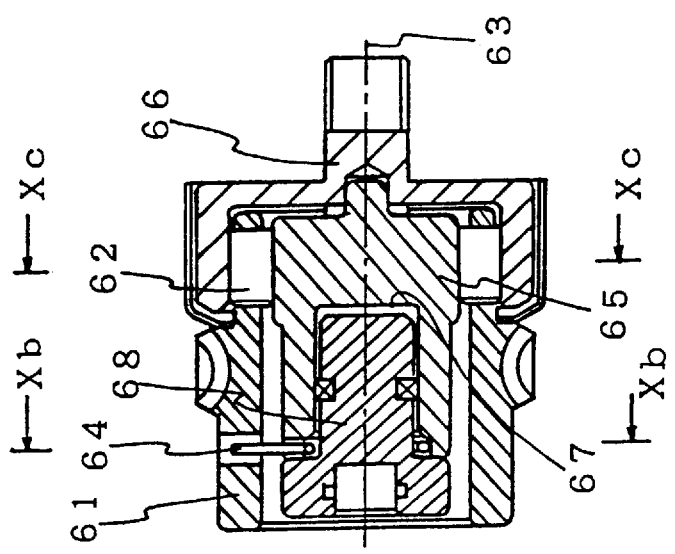
Figure 11:
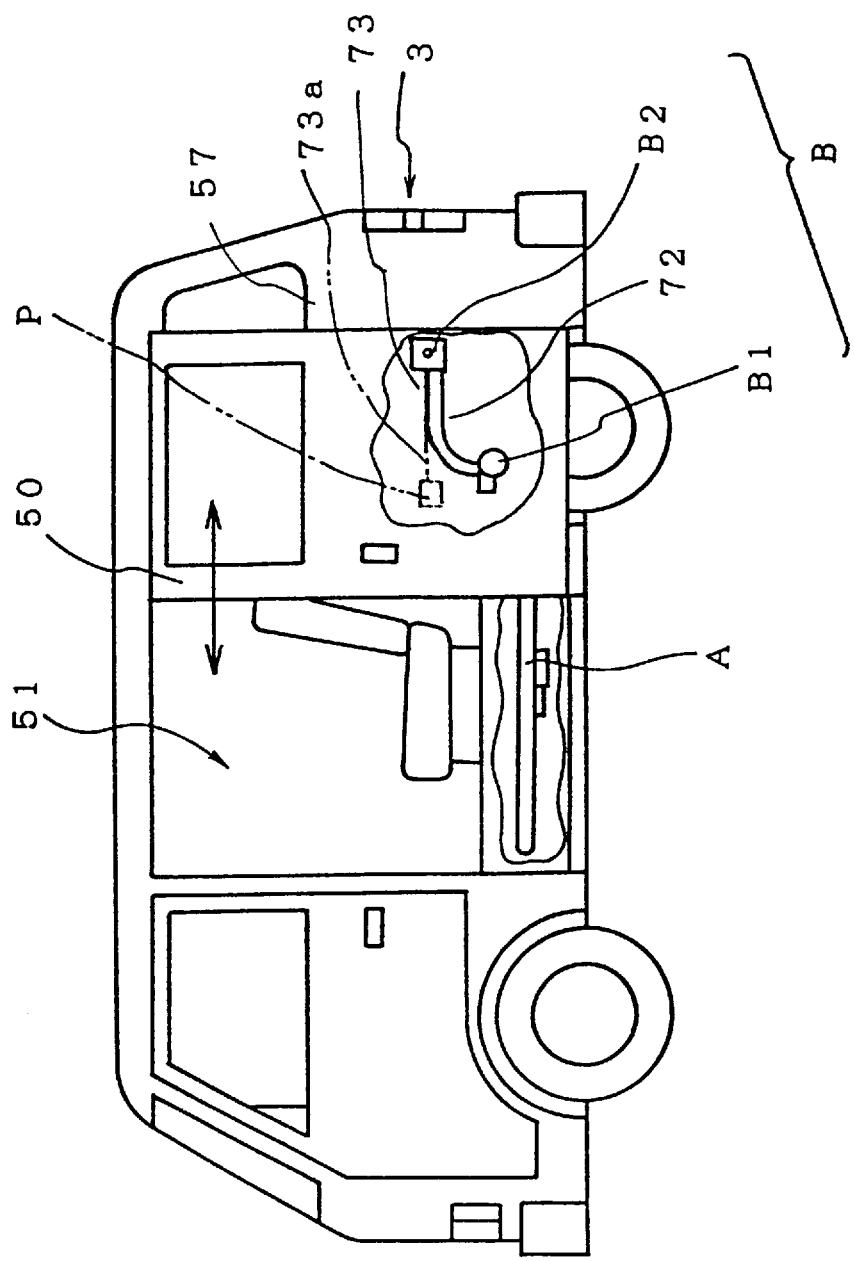
FIG. 11 is a partially-cut-off schematic side view showing an automobile with an embodiment of a powered sliding-door system of the present invention.
Figure 12:
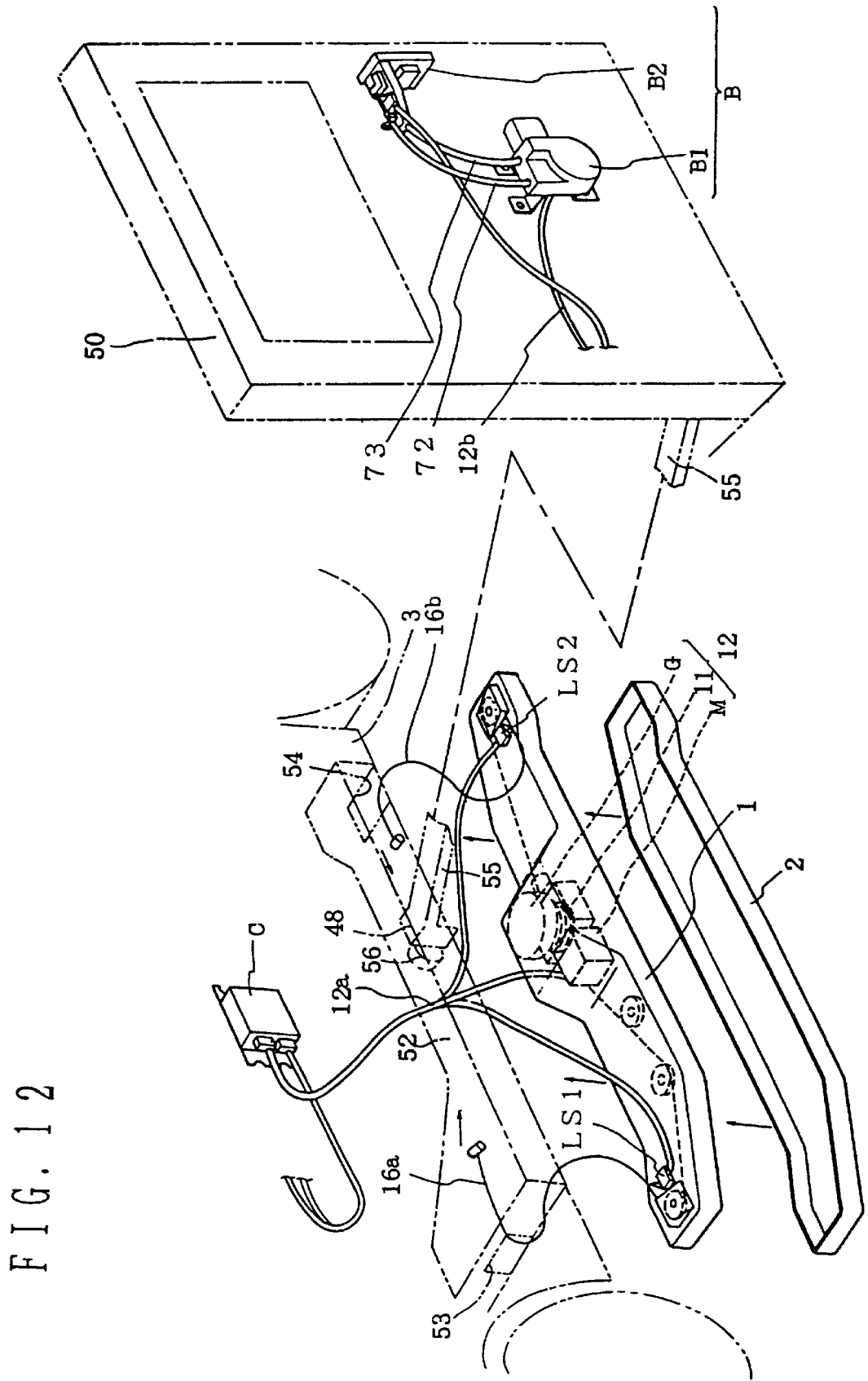
FIG. 12 is a perspective view showing an embodiment of a powered sliding-door system of the present invention.

In the beginning, referring to FIG. 11 and FIG. 12, whole of an embodiment of the powered sliding-door system of the present invention is explained briefly. The system comprises a sliding-door 50 of an automobile, a sliding-door driving device A for driving the door 50 in the front-and-rear directions along guide elements, an automatic door closer B for locking the door 50 at the closed state and unlocking the locked door, and a controller C to sequentially control those devices A and B. The slide motion actuating device A and the automatic door closer B are produced as assembled units and are attached to a body and a door, respectively. The automatic door closer B has a cable actuating device B1 and a door locking device B2 which are connected through control cables 61 and 62. Hereinafter, referring to FIG. 1 through FIG. 10, the sliding-door drive device A is explained.

Figure 1:
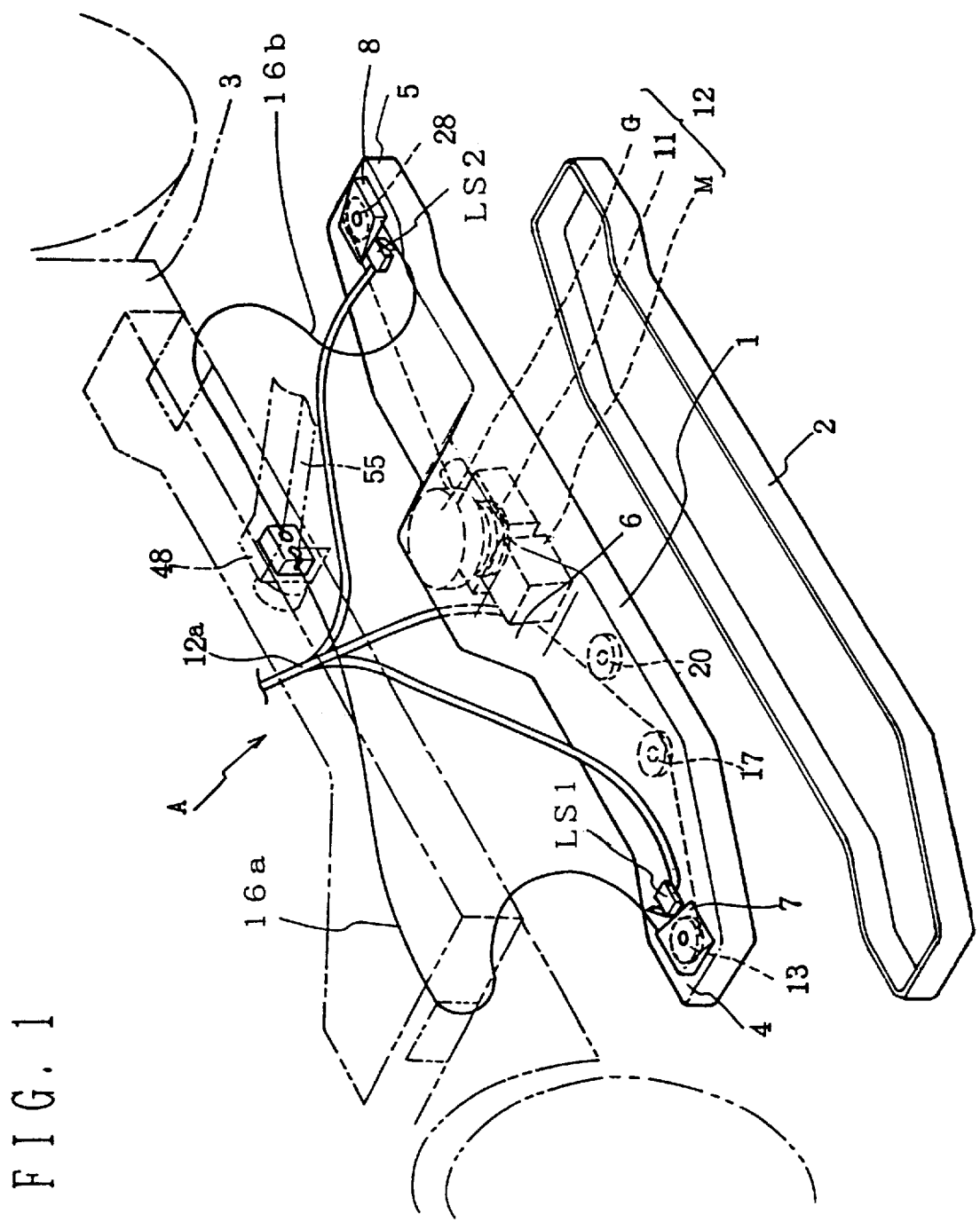
FIG. 1 is a schematic perspective view showing an embodiment of a sliding-door drive device of the present invention.

Referring to a sliding-door drive device A of FIG. 1, mark 1 denotes a shallow box-like case body or base plate which opens downward. Mark 2 denotes a shallow box-like cover attached to the lower side of the case body 1. The case body 1 and the case cover 2 form a unit case. The case body 1 extends in the front-rear direction of an automobile 3. The front portion 4 of the case body 1 corresponding to the front of the automobile 3 is biased toward inside (left-upper side in FIG. 1), and the rear portion 5 is biased toward outside oppositely.

The case body 1 has a deep center portion 6 projecting upward. Openings 9 and 10 are formed at the front end area and the rear end area of the case body 1, respectively, and each opening 9, 10 is covered with a shallow triangular pulley cover 7, 8. Limit switches LS1, LS2 are attached to the case body 1 at portions near each pulley cover 7, 8.

The case body 1 and the case cover 2 can be manufactured by stamping a hot-dip zinc-coated steel sheet. An actuator 12 having an electric motor M, a reduction gear G and a cable-winding drum 11 is attached in the center portion 6 of the case body 1. Electric cords 12a are extended from the actuator 12 and limit switches LS1, LS2, and the cords 12a are jointed to a controller (C in FIG. 12) which will be explained later.

Figure 2:
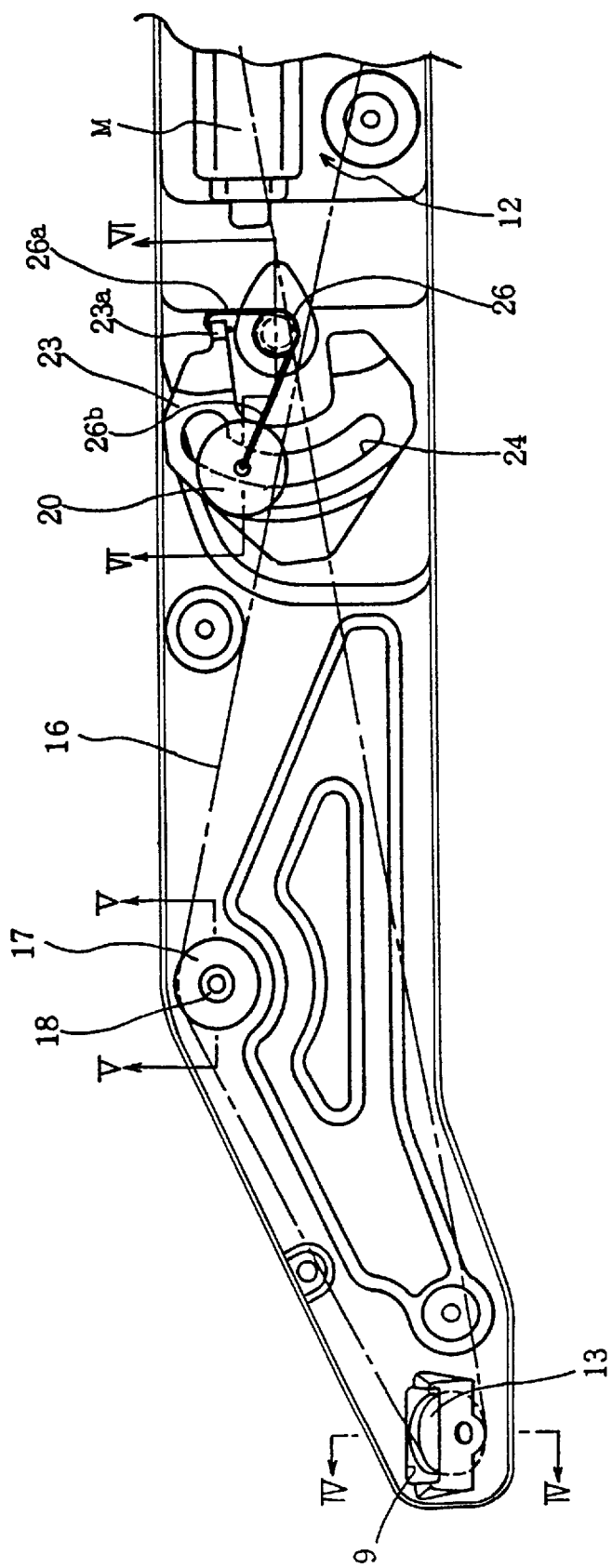
FIG. 2 is a bottom view showing a front side of the device of FIG. 1 with removing a bottom cover.

FIG. 2 shows a bottom view of a front half of the device of FIG. 1 in which the cover 2 is removed. The under side of FIG. 2 is the inner side of the automobile. In FIG. 2, the numeral 13 denotes a guide pulley attached to the inside of the above-mentioned pulley cover 7. The guide pulley 13 is rotatably mounted on an axis 14 which laterally inclines to the case body 1. A portion of periphery of the opening 9 in the case body 1 is slanted, and an end of the axis 14 is fixed to the slanting portion by clinching. Further another end of the axis 14 is supported by the above-mentioned pulley cover 7. The pulley cover 7 can be attached to the case body 1, for example, by engaging projections at the lower surface of the pulley cover 7 in holes formed in the case body 1.

Figure 3:
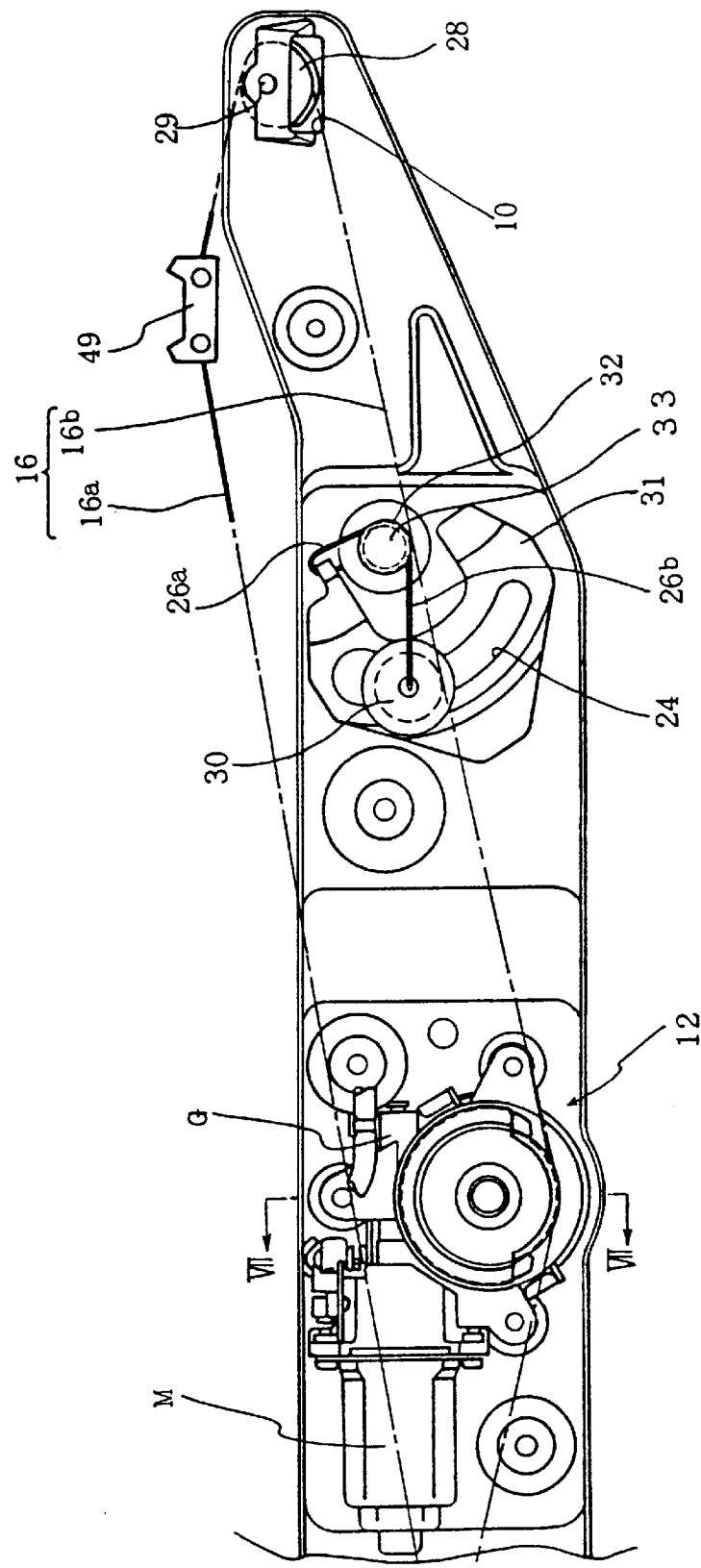
FIG. 3 is a bottom view showing the rear side of the device with removing a bottom cover.
Figure 4:
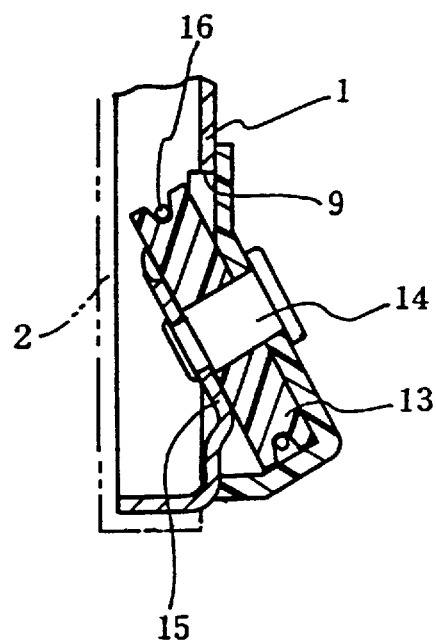
FIGS. 4, 5 and 6 are enlarged sectional views along lines IV—IV, V—V and VI—VI in FIG. 2, respectively.

As mentioned above, a portion of the guide pulley 13 facing inside of the automobile 3 in FIG. 3, projects over the upper surface of the case body 1, and the opposite portion of the guide pulley 13 projects under the case body 1. The guide pulley 13 and the pulley cover 13 are preferably made of engineering plastics such as polyacetal resin. The guide pulley 13 is engaged and wrapped with a cable 16 so as to guide the cable 16 from the inside of the case body 1 to the outside, and vice versa. The guide pulley 13 therefore turns the cable 16 for about 180° with respect to the front-and-rear directions of the automobile, as shown in FIG. 2.

Figure 5:
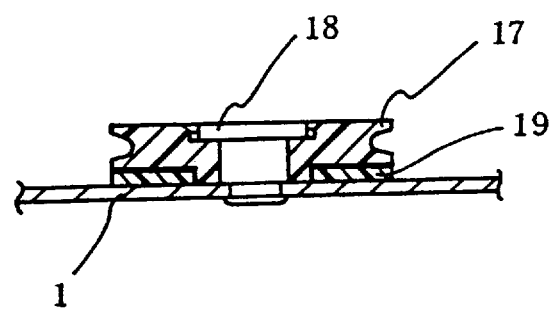

Mark 17 in FIG. 2 denotes an idle pulley for changing the direction of the cable 16 along the inner face of the side wall of the case body 1. As shown in FIG. 5, the idle pulley 17 is rotatably supported by an axis 18 having an end fixed to the case body 1 by clinching. Mark 19 in FIG. 5 denotes a washer or plate made of synthetic resin or metal, for reducing friction and improving sliding motion in rotation.

Figure 6:
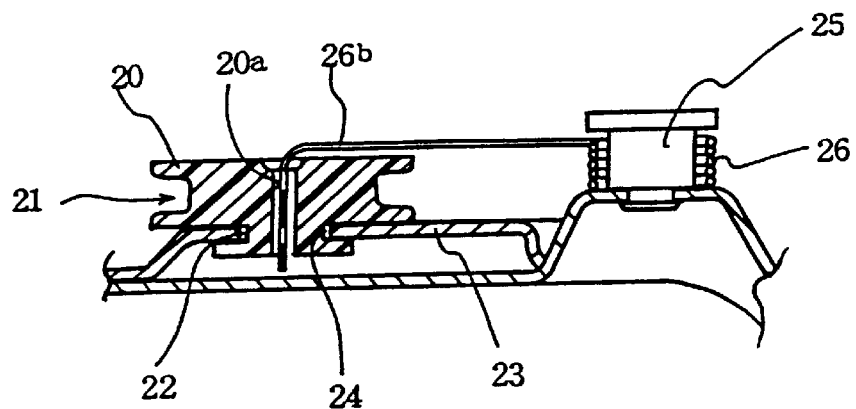

Referring to FIG. 2, a tension pulley 20 is attached behind the idle pulley 17 (right-hand side in FIG. 2). As shown in FIG. 6, the tension pulley 20 has a groove 21 for the cable, and has another narrow guide groove 22 at the lower portion. The guide groove 22 is slidably engaged with a periphery of an arc-shaped guide slot 24 formed in a guide plate 23 (see FIG. 2). The guide plate 23 is fixed on the case body 1. Further, a stud 25 is fixed on a portion corresponding to the center of the arc-shaped guide slot 24. A coil portion of a torsion coil spring 26 is mounted around the stud 25 loosely. An arm 26a of the torsion coil spring 26 is engaged with a hook portion 23a, and another arm 26b is loosely inserted in a center hole 20a of the tension pulley 20 so as to allow rotation thereof. The tension pulley 20 can therefore urge the cable 16 laterally by means of the torsion coil spring 26 so as to provide a suitable tension in the cable.

FIG. 3 shows a looking up state of the rear half of the device A of FIG. 1 without cover. A guide pulley 28 mounted on the rear end of the case body 1 is substantially the same as the above-mentioned guide pulley 13 which is mounted on the front end of the case body 1. An inclining axis 29 supporting the guide pulley 28 and a pulley cover 8 are the same as the above-mentioned axis 14 and pulley cover 7 of the front side. However, the inclining axis 29 inclines towards outer side of the automobile opposite to the front axis 29. That is to say, the guide pulley 28 inclines such that the outer side (upper side in FIG. 3) relating to the automobile projects upward from the case body 1, and the inner side sinks downward in the case body 1. A rear side guide member, (tension pulley 30), a guide plate 31, a torsion coil spring 32, and a stud 33 are the same as the corresponding front side members.

Figure 7:
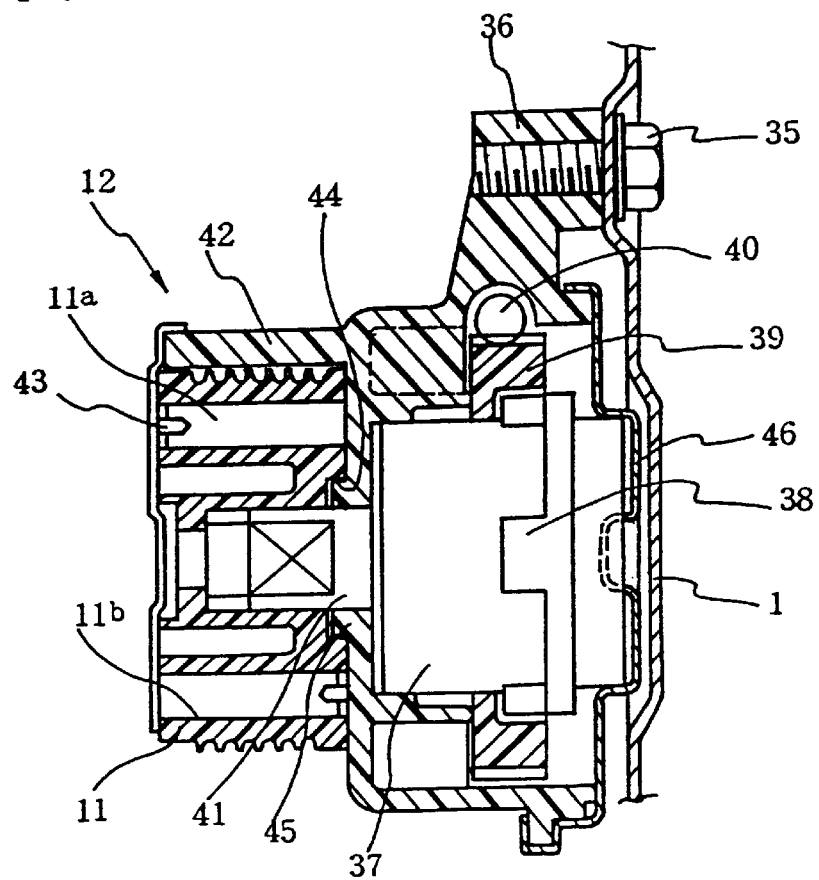
FIG. 7 is an enlarged sectional view along lines VII—VII in FIG. 3.

Referring to FIG. 7, the actuator 12 mounted on the center portion of the case body 1 has a housing 36 fixed to the base plate 1 by screws 35. The housing 36 houses a two-way clutch 37, a worm wheel 39 meshing with an engaging portion 38 of the two-way clutch 37, and a drum 11 connected with an output shaft 41. A worm 40 is connected with an output shaft of the motor M in FIG. 3. The worm 40 and the worm wheel 39 construct the above-mentioned reduction gear G. The housing 36 has a partially cut-off cylindrical projection 42 for housing the drum 11. A drum cover 43 is attached to the front end of the cylindrical projection 42. The housing 36 has a supporting step 45 to be rotatably engaged with a corresponding step 44 formed in the drum 11. Further, a bottom cover 46 for rotatably supporting an input portion of the two-way clutch 37 is attached at another end of the housing 36.

Figure 8:
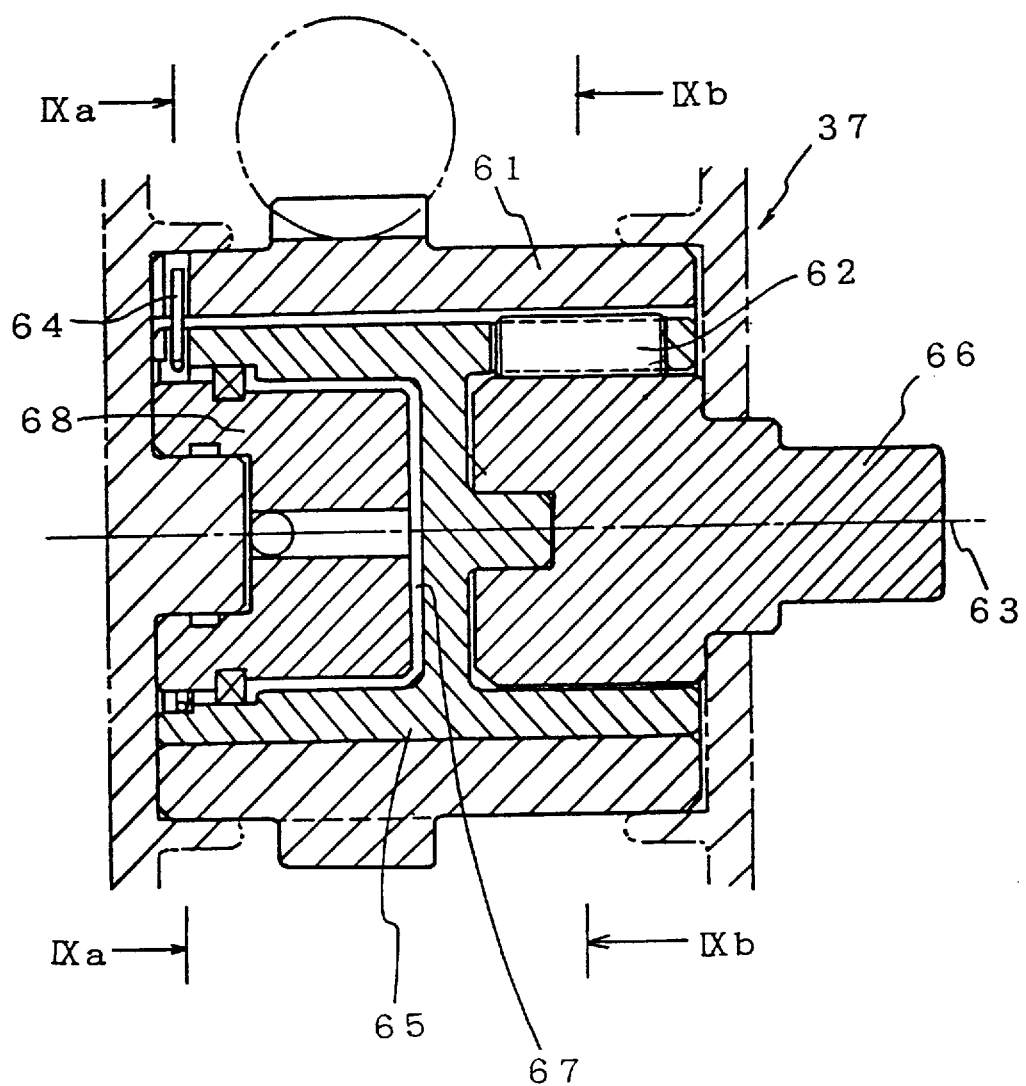
FIG. 8 is a longitudinal sectional view showing an example of two-way-clutch adapted to the sliding-door drive device of the present invention.
Figure 9A:
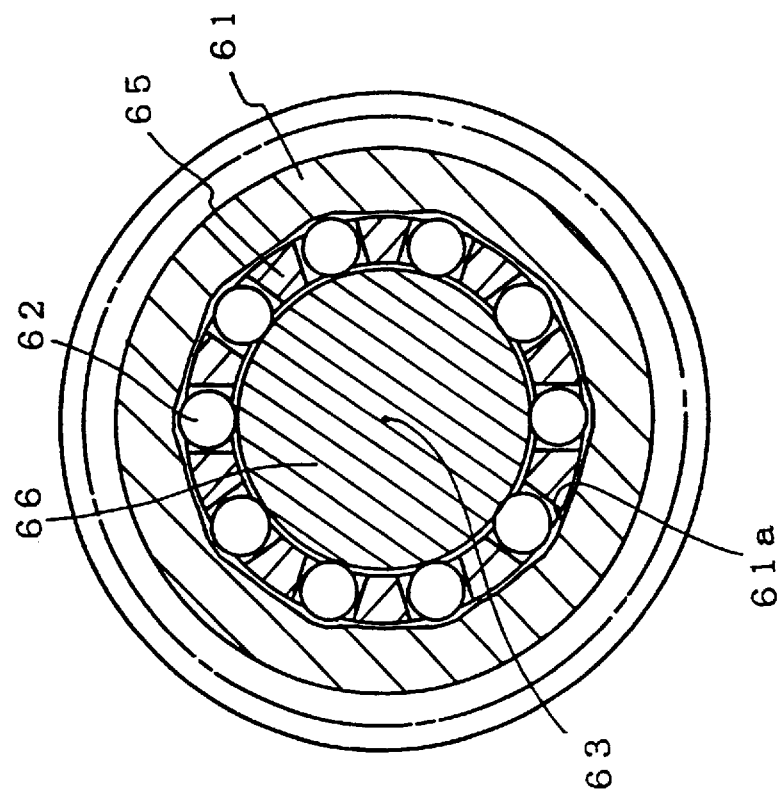
FIG. 9a and FIG. 9b are sectional views along lines IXa—IXa and IXb—IXb in FIG. 8.
Figure 9B:
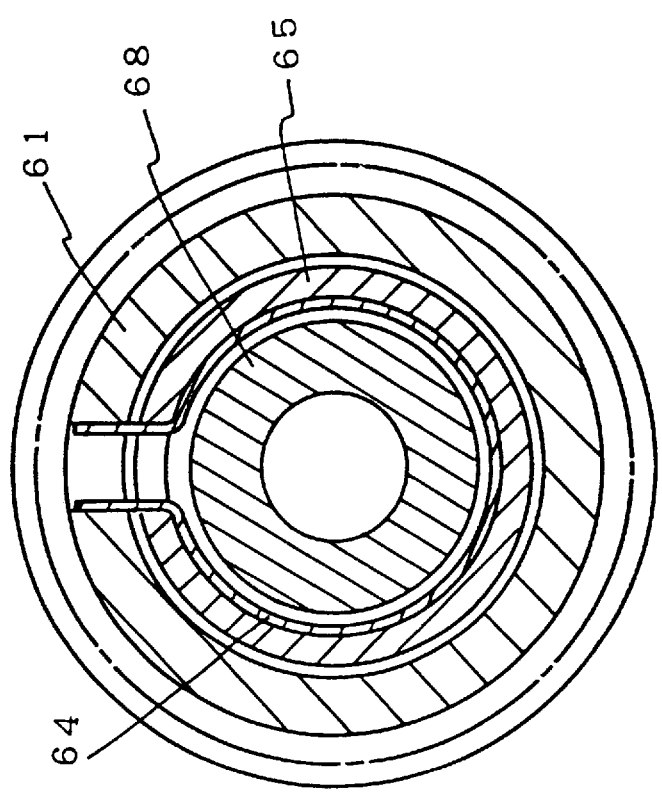

As the above-mentioned two-way clutch 37, a clutch spring disclosed in Japanese Unexamined Patent Publication No.134730/1982 can be employed for example. However, it is more suitable to use a friction-roller type of two-way clutch (No.DTWC-02) which is joint developed by the applicant and NTN K.K. This two-way clutch has, as shown in FIG. 8 and FIG. 9b, a worm wheel 61 driven by an electric motor through a worm, a set of friction-rollers 62 driven by the worm wheel around a center of rotation 63, and a middle shaft 75 which follows the set of friction-rollers 62 with some delay through a center spring 64.

An output member 66 of the two-way clutch can be driven selectively in both directions through the friction-rollers 62 by virtue of wedge function between the outer surface of the output member 66 and slanting surface 61a of the inner surface of the worm wheel 61. The middle shaft 65 is rotatably supported on a supporting shaft 68 through a high viscous fluid, and therefore the above-mentioned delay between the worm wheel 61 and the middle shaft 65 can be maintained.

On the contrary, even though the output member 66 is driven, the worm wheel 61 cannot be driven, since the middle shaft 65 returns to the original position due to the centering spring 64, and the wedge function do not arise in the friction-rollers 62.

Another two-way clutch shown in FIG. 10a, FIG. 10b and FIG. 10c has friction rollers 62 between an inner surface of an output member 66 and flat faces 65a of a middle shaft 65.

With respect to those above-mentioned friction-roller type of two-way clutches, Japanese Patent Application have been filed already as Japanese Patent Applications No.101463/1992 and No.321848/1992.

As shown in FIG. 2 and FIG. 3, the above-mentioned cable is arranged like a closed loop. In the embodiment, the cable 16 is separated to a first cable 16a and a second cable 16b. The first cable 16a extends from a connecting portion (see mark 48 in FIG. 1) to be connected to an arm 55 attached to the sliding-door of the automobile 3 and crosses aslant over the case body 1. Then the first cable 16a is turned by the front guide pulley 13 and comes into the case body 1. Further, through the idle pulley 17 and the front tension pulley 20, the first cable 16a is wrapped around the drum 11 and anchored to the drum 11 in the actuator 12. The second cable 16b extends from the drum 11 to the rear tension pulley 30 and the rear guide pulley 28 and returns to the connecting portion 48.

In FIG. 3, both ends of the first cable 16a and the second cable 16b are temporarily jointed with each other by means of an end-holder 49 instead of the connecting portion 48 of the arm 55. The end-holder 49 is a temporary member which is used for manufacturing, storing and delivering the sliding-door drive device A as a unit, and therefore, the end holder 49 has the same shape and the same dimension as the connecting portion 48.

Further, a cable-end member is fixed to each end of the first cable 16a and the second cable 16b. The cable-end member is to be engaged with the connecting portion 48 and the end-holder 49. At another ends of cables 16a, 16b, another cable-end members are fixed so as to be anchored in engaging holes 11a, 11b in the drum 11 (see FIG. 7).

The above-mentioned sliding-door drive device A can be attached under the floor of a van type of automobile 3 as shown in FIG. 11. That is to say, the device A is attached to the floor situated at lower side of an opening (doorframe) 50 to be closed by the sliding-door 50, from the under side.

Referring to FIG. 12, the process of attaching the device A is as follows. (1)The end-holder 49 is removed so as to be the ends of the first cable 16a and the second cable 16b free. (2)Those ends of cables are inserted through openings 53, 54 provided at front and rear ends of a guide portion 52 for guiding the door 50. (3)The ends of cables are anchored to the connecting portion 48 of the arm 55 which projects from the inside of the door 50. (4)The case body 1 of the unit case without case cover 2 is attached to the lower surface of the guide portion 52. (5)Various kinds of regulation are performed as occasion demands. (6)The case cover 2 is attached to the case body 1.

As shown in FIG. 12, a roller 56 is rotatably attached to an end of the arm 55. The roller 56 supports a part of weight of the door 50, and is guided by the guide portion 52. The door 50 is guided such that the door moves along a predetermined route, by the guide portion 52 by a guide rail (not shown in drawings) of the guide portion 52, and by another guide mechanisms which are provided on a middle portion and an upper portion of the side panel 57 of the automobile 3 in FIG. 11. That is to say, when the door 50 shuts the opening 51, the outer surface of the door 50 flushes with the side wall 57 of the automobile. At beginning of open of the door 50, the door 50 moves aslant, and then the door 50 floats somewhat from the side wall 57. Further the surface of the side wall 57 is covered with the door 50 when the door slides to the rear end.

In the above-mentioned sliding-door drive device A, when the motor M of the actuator 12 rotates in a direction, the drum 11 is rotated in the first direction. Then, the first cable 16a, for example, is wound around the drum 11 and the second cable 16b is unwound such that the loop of cables 16a, 16b circulates in a direction. The arm 55 engaged with the ends of the cables 16a and 16b is therefore moved from the door-open state mentioned with real lines to the left-handed side through a motion parallel with the side wall 57 of the automobile. At last, the door 50 moves in the slant direction as shown by arrow mark J.

When the door 50 is opened, the motor M rotates in the opposite direction to move the arm 55 in the slant direction as shown by arrow mark K. The door 50 is driven thereafter toward the rear end through a parallel motion with the side wall 57 from the half way.

Figure 13:
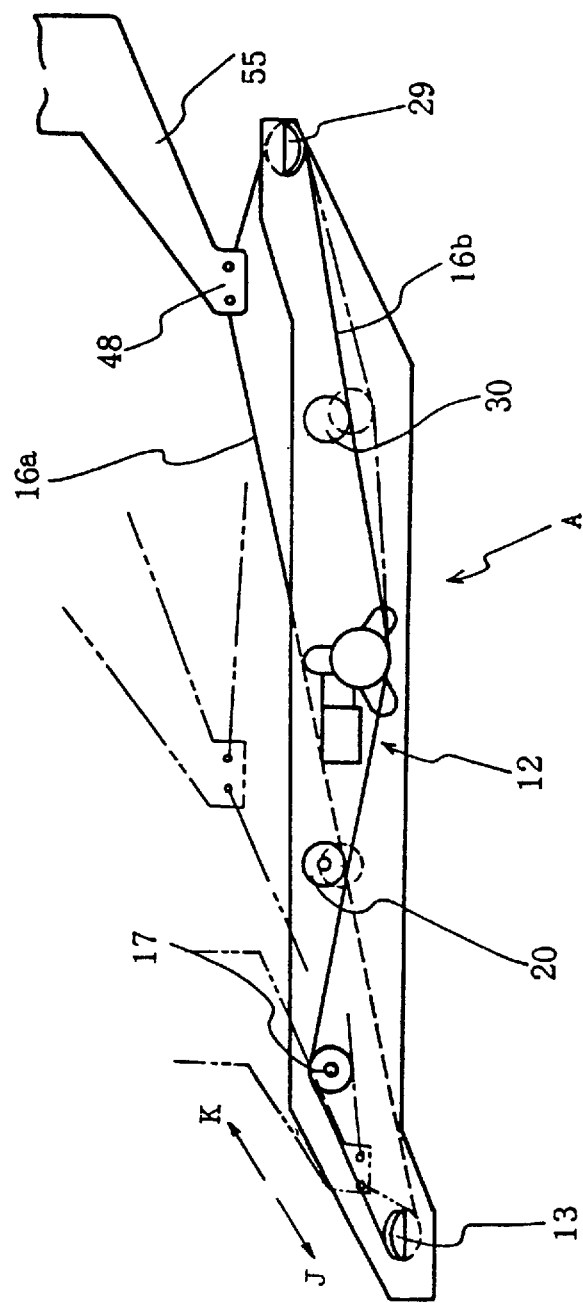
FIG. 13 is a bottom view showing a motion of the sliding-door drive device of FIG. 1.

Therefore, form of the loop of cables 16a, 16b changes according to the positions of the door 50, that is, the position of the arm 55, as shown by the real lines, broken lines and imaginary lines of FIG. 13. And the effective length of the loop also changes according to the form of loop changes. However, the change of the effective length of the loop can be absorbed by the above-mentioned tension pulleys 20, 30.

Moreover, the cables 16a, 16b are arranged astant at the working area (out of the case) by means of the laterally sifted pair of guide pulleys 13 and 28. Therefore, the door 50 can be driven in the slanting direction by a lateral component of the stanting cables 16a, 16b. As a result, even just before the door 50 shuts the opening 51 or just after the door 50 moves from the closing position, the door 50 can be smoothly driven in the slanting directions as shown by arrow marks J and K.

Besides, referring to FIG. 12, the mark C denotes a controller to be attached to the automobile body. The controller C has a control circuit for supplying electric power for regular rotation or opposite rotation to the motor M in the actuator 12. The power is supplied through electric cords 12a according to an operation of the driver or passengers is the automobile. And the controller C has a control circuit for stopping the electric power so as to stop the motor M according to a signal of door-closed position or the door-open position from limit switches LS1 and LS2. Those electric circuit can be realized by a micro processing unit, read-only-memory to store various programs and data, relays to turn on or off the electric power, and the like.

Referring to FIG. 11, the door 50 houses an automatic door closer B (a device complete closing of sliding-door which is slightly ajar and to release locked latch). The automatic door closer B has an actuating device or actuator B1 to rotate a drum by an electric motor and a locking device B2 actuated by the actuator B1 through control cables 72, 75. The automatic door closer B can be forcibly operate a latch in the locking device B2 from a half latch position (door slightly ajar position) to a fully latch position (door fully closed position) through a closing control cable or close cable 61 according to the regular rotation of the motor in the actuator B1. Further the automatic door closer B can forcibly operate the latch from the fully latch position to an unlocked position through an unlocking control cable or open cable 62. Therefore, the sliding-door drive device A can do enough to close the door 50 from fully open position to a slightly ajar position, and to open the door 50 from the slightly ajar position to the fully open position.

Though the above-mentioned automatic door closer B can serve as an opener also, another opener for unlocking the latch can be employed independently, as shown by imaging lines in FIG. 11.

Figure 14:
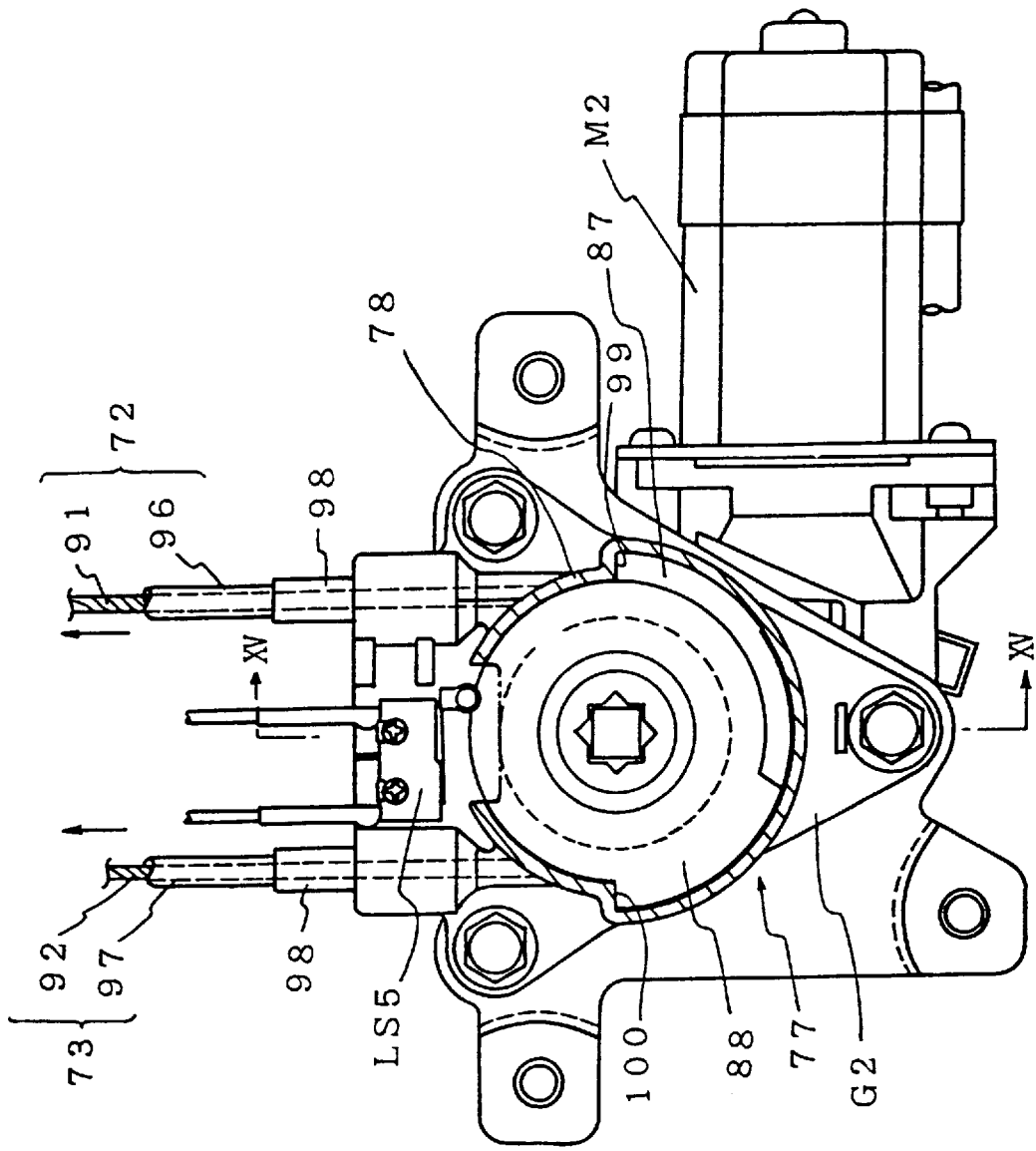
FIG. 14 is a partially-cut-off front view of an embodiment of an automatic door closer of the present invention.
Figure 15:
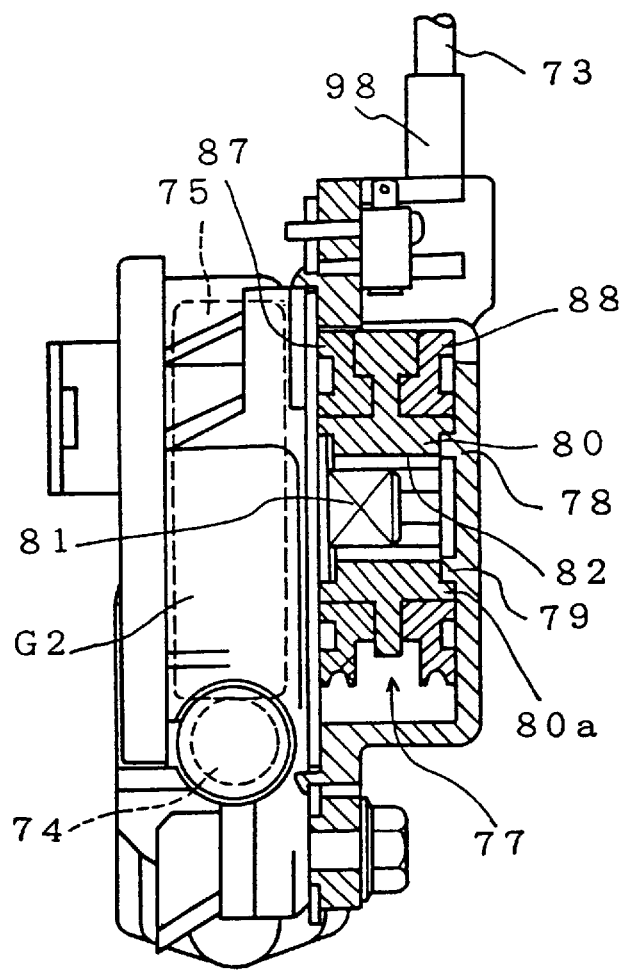
FIG. 15 is a cross sectional view along lines XV—XV in FIG. 14.

Referring to FIG. 14 and FIG. 15, the above-mentioned cable actuator B1 has an electric motor M2, a reduction gear G2 and an output portion 77 attached to the reduction gear G2. The reduction gear G2 has a worm gear 74 driven by the motor M2, a worm wheel 75, and the like. The output portion 77 has a partially-cut-off cylindrical housing 78 and a drum 80 rotatably mounted on an annular projection 79 on the inner bottom of the housing 78. The drum 80 has a side face with a step portion 80a to be mounted on the annular projection 79, and has an engaging hole 82 at the center thereof. The hole 82 has a square sectional shape, and an output shaft 81 of the reduction gear G2 is inserted in the hole 82. Then thedrum 80 is supported by the annular projection 79 and the output shaft 81. Beside, mark LS5 denotes a limit switch to detect that the drum 80 is in a neutral or regularposition.

Figure 16:
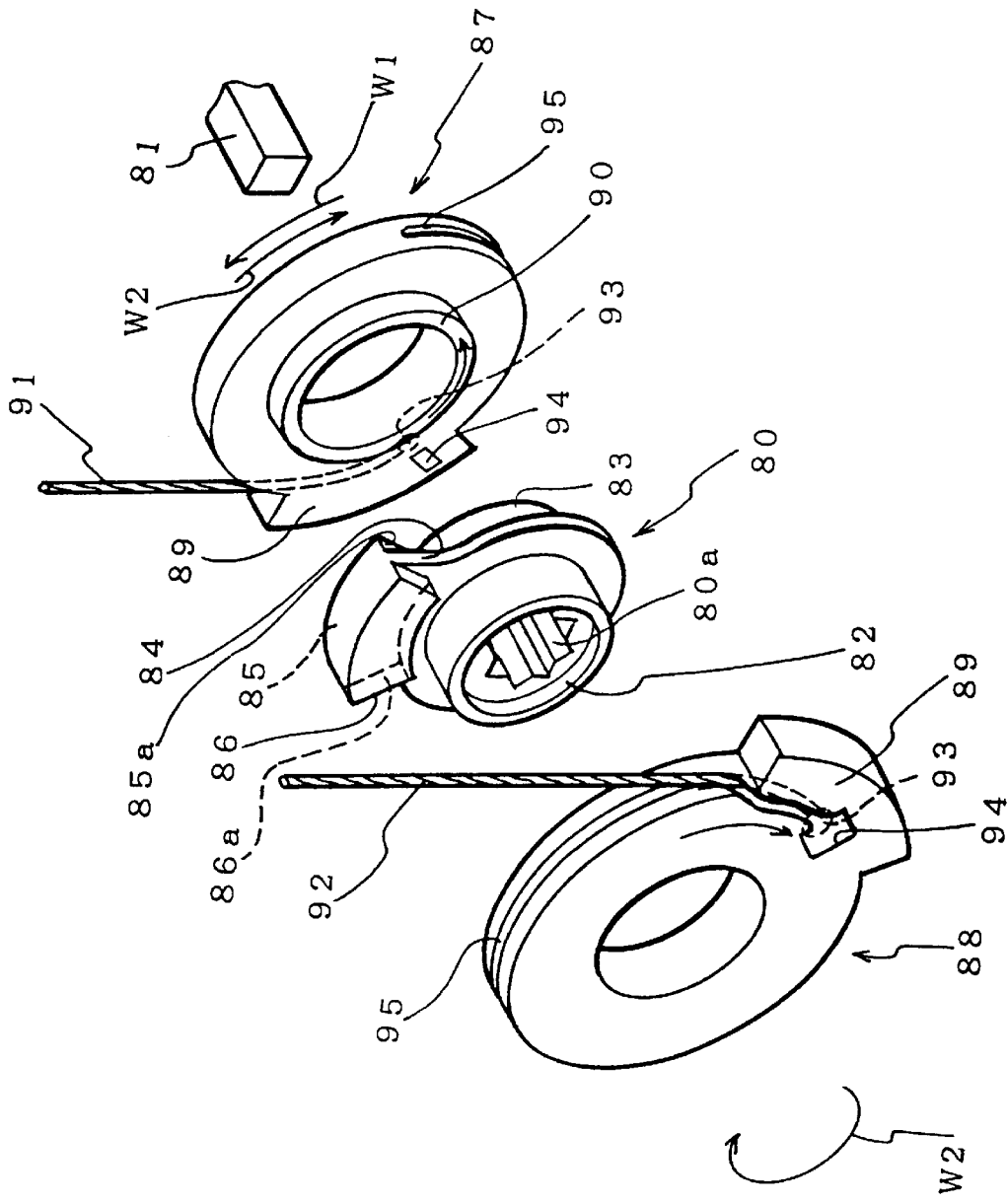
FIG. 16 is a perspective view showing a main part of the automatic door closer of FIG. 14.

Referring to FIG. 16, the drum 80 has a cylindrical boss 83, and a disc-like separating plate 84. The separating plate 84 has a square projection, and fan-like engaging portions 85, 86 are projected from both side surfaces of the square projection. A pair of pulleys 87 and 88 are rotatably mounted on the boss 83 so that the separating plate 84 is interposed between the pulleys 87, 88. Each pulley 87, 88. has a fan-like projection or abutting portion to abut against side faces 85a, 86a of the engaging portions 85, 86 of the drum 80 when the drum 80 rotates.

Further, in the embodiment, each pulley 87, 88 has a fan-like projection 89 and an annular projection 90 to abut against the separating plate 84 of the drum 80, and the annular projection 90 slides with the under surface of the engaging portion 85, 86 of the drum 80. The fan-like projection 89 of the pulley 87, 88 is provided with a hole 94 for anchoring an end member 93 of an inner cable 91, 92 of the control cable. The hole 94 is connected to a cable-guide groove 95 in the outer surface of the pulley 87, 88.

One pulley (first pulley) 87 is arranged at the inside, and another pulley (second pulley) 88 is arranged at the outside. The first and the second pulleys 87, 88 have the same shape and are arranged so as to face with each other with respect to the drum 80. Therefore, the holes 94 direct in opposite directions as shown by arrow marks W1, W2, and the winding directions of the inner cables 91, 92 are also opposite.

An inner cable (first inner cable) 91 having an end anchored to the first pulley 87 and wrapped around the first pulley 87 is inserted through a conduit 96 for the close control cable 72 of FIG. 14 and is guided to the door locking device B2 in FIG. 12. Another inner cable (second inner cable) 92 having an end anchored to the second pulley 88 and wrapped around the second pulley 88 is inserted through another conduit 97 and is also guided to the door locking device B2. Those conduits 96, 97 are connected to cable connecting portions 98 of the housing 78 and fixed to them. Referring to FIG. 14, the housing 78 has stoppers 99, 100 to which fan-like projections 89, 89 of the pulleys 87, 88 are abutted so as to determine the neutral position.

In the above-mentioned cable actuating device B1, the inner cables 91, 92 are pulled by urging force of return springs in the door-locking device B2 side. Therefore, as shown in FIG. 14, the first pulley 87 rests at the neutral position as the fan-like projection 89 abuts against a stopper 99, and the second pulley 88 also rests at the neutral position as the fan-like projection 89 abuts against another stopper 100.

Under the condition, when the motor M2 rotates in such direction that the output shaft 81 of the reduction gear G2 rotates in the direction of arrow mark W1 in FIG. 16, the drum 80 also rotates in the direction W1. After the drum 80 rotates, the side face 85a of the engaging portion 85 of the separating plate 84 abuts against the side face of the fan-like projection 89 of the first pulley 87. Then the first pulley 87 is rotated in the direction W1. The first pulley 87 therefore winds up the first inner cable 91 in the guide groove 95 to pull the inner cable 91 against the return spring in the door locking device B2. During the above-mentioned motion, the second pulley 88 keeps to rest at the neutral position.

Next, the motor M2 rotates in the opposite direction to rotate the output shaft 81 in the direction W2. The drum 80 is therefore driven in the direction W2. Then the motor M2 is stopped as the limit switch LS5 detects that the drum 80 returns to original neutral position. The first pulley 87 therefore rotates in the direction W2 with following the rotation of the drum 80 by means of urging force of the return spring. Thus the first inner cable 91 goes and returns due to the go-and-return rotations of the motor M2.

While, the pull operation of the second inner cable 92 by the second pulley 88 is substantially the same as the above-mentioned, but directions are opposite. That is to say, the motor M2 rotates in the opposite direction to rotate the output shaft 81 in the direction W2. The drum 80 and the second pulley 88 are also driven in the direction W2 to wind up the second inner cable 92 around the second pulley 88. Then, the motor M2 rotates in the regular direction to rotate the drum 80 in the direction W1 until the limit switch LS5 detects the return of the drum 80.

As mentioned above, the cable driving device B1 can selectively operate one of the two inner cables 91, 92 by means of a single motor M2 and a single reduction gear G2. Beside, in the above-mentioned embodiment, a limit switch LS5 is employed for stopping the drum 80 at the regular position, since the drum 80 rotates in both directions from the regular position. Further, in the embodiment, a play is provided between the regular or rest position of the drum 80 and the rest positions of the pulleys 87, 88, and the stoppers 99, 100 are employed to stop the pulleys 87, 88. Therefore, even though the drum 80 returns and stops at not correct position, each pulley 87, 88 can be accurately stopped with the stoppers 99, 100.

Hereinafter, referring to FIG. 17 through FIG. 20, the door-locking device B2 will be explained. Mark 101 denotes a housing which has the same shape as a known device, and mark 102 denotes a bracket attached on the back side of the housing 101. The housing 101 and the bracket 102 can be manufactured as one body. At the front side of the housing 101, a disc-like latch 103 is rotatably mounted to the housing 101 by means of a rotary shaft 104. The latch 103 can rotate between an open position I and a fully latch position III. A half latch position II is in the middle way between them.

Figure 20:
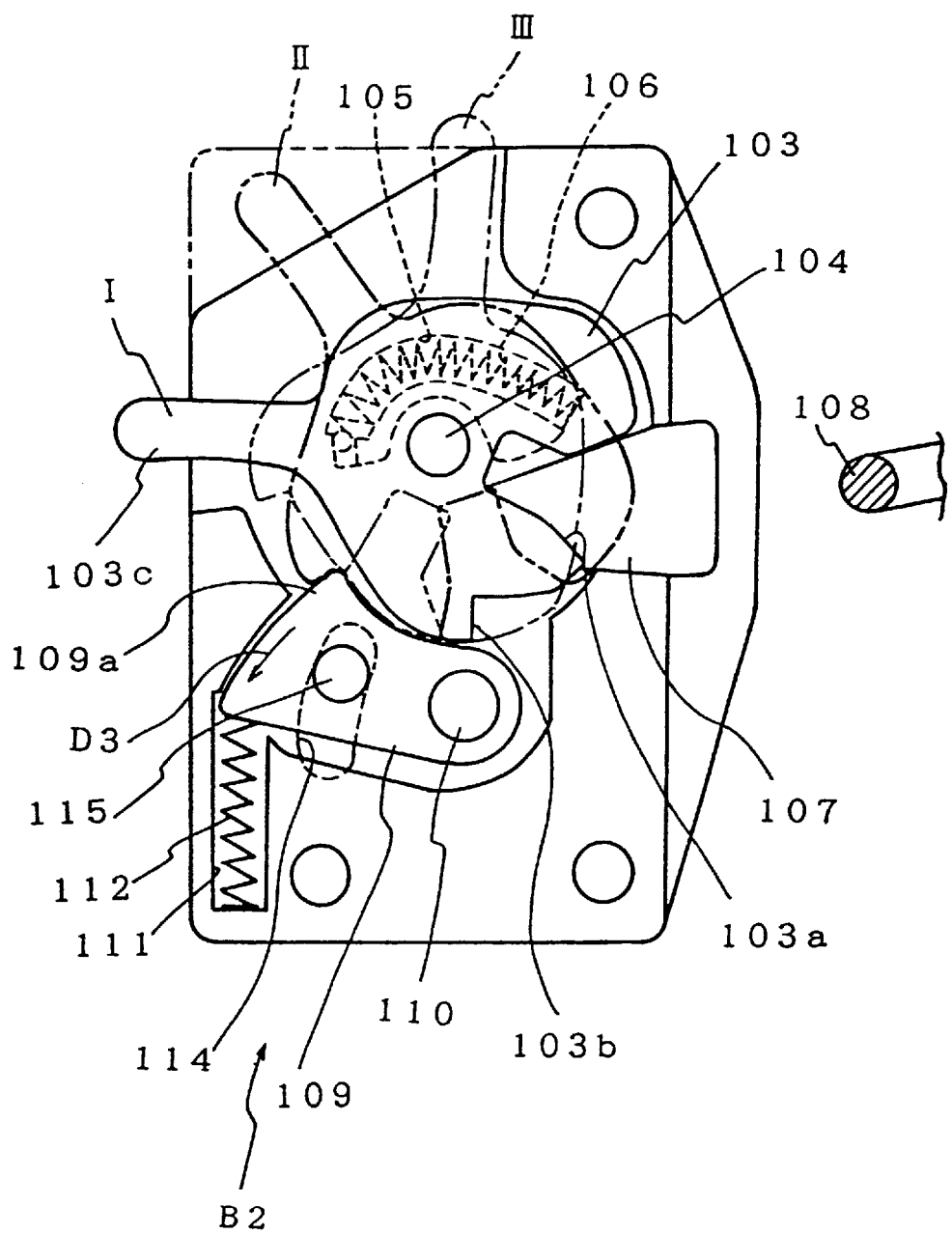

Referring to FIG. 20, a half-circle or J-shaped groove 105 is formed in the front face of the housing 101 so as to surround the rotary shaft 104. A return spring 106 is housed in the J-shaped groove 105. Mark 107 in FIG. 20 denotes a guide for receiving a striker 108 attached to the automobile body side. In the present embodiment, the shaft 104 passes through the housing 101, and a cam 104a for a limit switch LS3 is attached on the rear end of the shaft 104. As shown in FIG. 20, a known claw 109 to be engaged with the latch 103 is rotatably mounted by means of another shaft 110. The claw 109 has a free end 109a to engage with a fully latch engaging portion 103a and a half latch engaging portion 103b of the latch 103 so as to keep the latch 103 without rotating in the direction of open position I. Further, the claw 109 is ordinarily urged by the return spring 112 toward the latch 103 so as to engage with the latch.

The engaging portions 103a and 103b of the latch 103 and the free end 109a of the claw 109 construct so called ratchet mechanism. That is to say, the claw 109 allows a rotation of the latch 103 in the fully latch position side, but does not allow any rotation of the latch 103 in the open position side. The latch 103 has a lever portion or finger 103c for operation at back side thereof.

Figure 17:
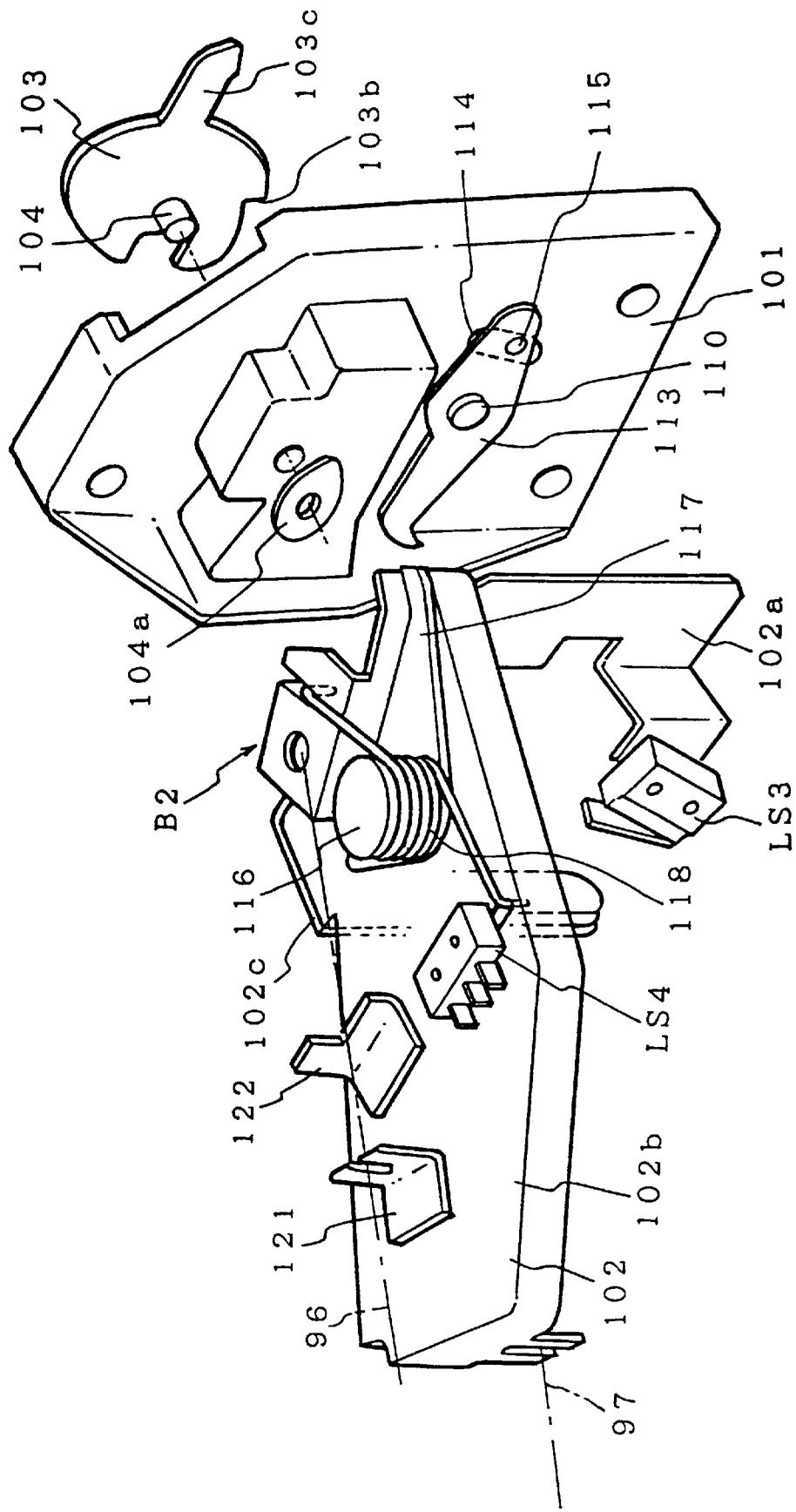
FIG. 17 is a perspective view showing an embodiment of a door locking device of the present invention.

The shaft 110 of the claw 109 also passes through the housing 101, and the shaft 110 supports a lever 113 at an end thereof at the back side of the housing 101 so that the lever 113 can rotate as shown in FIG. 17 and FIG. 20. Further, an arc-shaped slot 114 surrounds the shaft 110, and a pin 115 inserted through the slot 114 joints the claw 109 and the lever 113 so as to rotate together. The arc-shaped slot 114 and the pin 115 serve as stoppers which determine the rotary angle of the claw 109 and the lever 113.

As shown in FIG. 17, the above-mentioned bracket 102 has a front plate 102a closely fixed on the back face of the housing 101, a box-like body 102b extending from the upper portion of the back face of the housing 101 toward rear side, and a lever-supporting portion 102c extending from the front end of the front plate 102a to the side of the body 102b. In the present embodiment, the front plate 102a and the body 102b are made by bending a metal sheet, and the lever supporting portion 102c is fixed to the combined front plate 102a and the body 102b by welding or the like. However, another manufacturing process, such as one-body casting, can be employed.

Referring to FIG. 17, a pin 116 is fixed on the body 102a, and a substantially L-shaped close lever 117 is rotatably mounted on the pin 116. The close lever 117 is ordinarily urged to rotate in the direction of arrow mark C1 in FIG. 18 by a return spring 118 which is a torsion coil spring. In this embodiment, the close lever 117 is made by bending a metal sheet to a shape having a substantially triangular base 117a, a rib 117b arising from a side of the base 117a, an arm 117c extending from the upper end of the rib 117b. The front end of the base 117a and the rib 117b are provided with a free end 117d for engaging with the finger 103c of the latch 103.

Further, an end of the above-mentioned return spring is engaged with the arm 117c. An extended end of the arm 117c is bent, and the bent portion and the arm 117c serve as a cable-anchoring portion.

A guide pin 117e is fixed on the under surface of the base 117a, and an arc-like slot 119 is made in the body 102b of the bracket 102. The guide pin 117e passes through the slot 119, and the lower end of the guide pin 117e projects from the rear face of the body 102b. The guide pin 117e is a member to determine an end of rotational motion in the direction C1 of the close lever 117, and a head of the guide pin 117e slides on the rear face of the body 102b to prevent the close lever 117 from lifting.

On the upper face of the body 102b, a member 121 for attaching an end of the conduit 96 of the close control cable for operating the close lever 117 is fixed. Further, a stopper 122 for determining another end of rotational motion of the close lever 117 is also fixed on the upper face of the body 102b. A limit switch LS3 for detecting that the close lever 117 comes to the end of motion in the closing side is also attached on the upper face of the body 102b.

Figure 19:
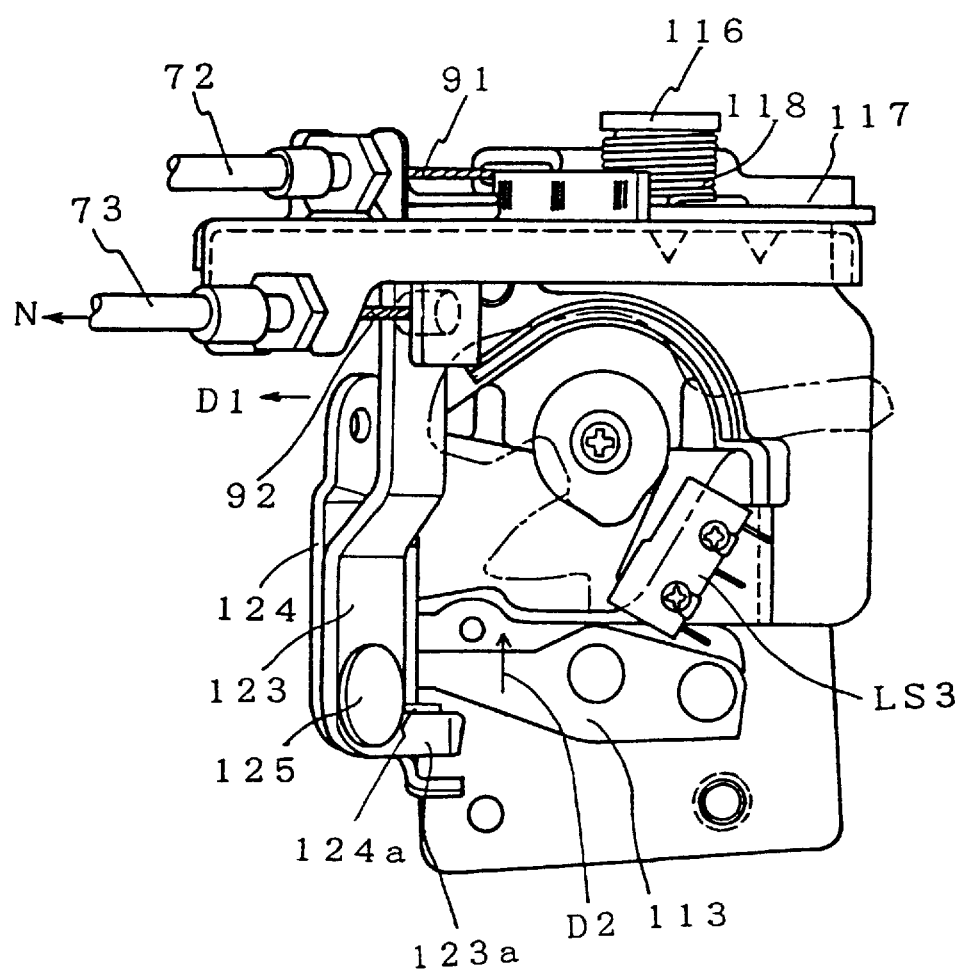
FIG. 19 and FIG. 20 are side views from mark XIV side and mark XX side, respectively, in FIG. 18.

Referring to FIG. 19, at the lower portion of the lever supporting portion 102c, an open lever 123 driven by a cable and another open lever 124 to be manually operated are rotatably mounted on a pin 125. Each open lever 123, 124 has a finger 123a, 124a to engage with the lever 113 for operating the above-mentioned claw 109.

An end of the inner cable 92 of the open control cable 73 is anchored to the upper end of the open lever 123, and the end of conduit 97 guiding the inner cable 92 is fixed to a rear end of the body 102b of bracket 102. Beside, the manually operable open lever 124 is connected to a handle of the sliding door through a known rod or the like.

Lever ratio or leverage ratio of the open lever 123 is preferably 2/5 to 7/10. Lever ratio of the lever 113 to operate the claw 109 is preferably 4/5 to 6/5, for example. By arranging two levers 113 and 123 in mechanically series, as mentioned above, a large whole lever ratio can be realized. Operating power to open therefore can be reduced, and an inner cable as slender as the closing side can be employed for the opening side. Though operation stroke and speed of the inner cable become large on the contrary, the inner cable can be operated enough since a cable winding drum or pulley is employed as a cable actuator instead of a lever-type actuator.

Figure 18:
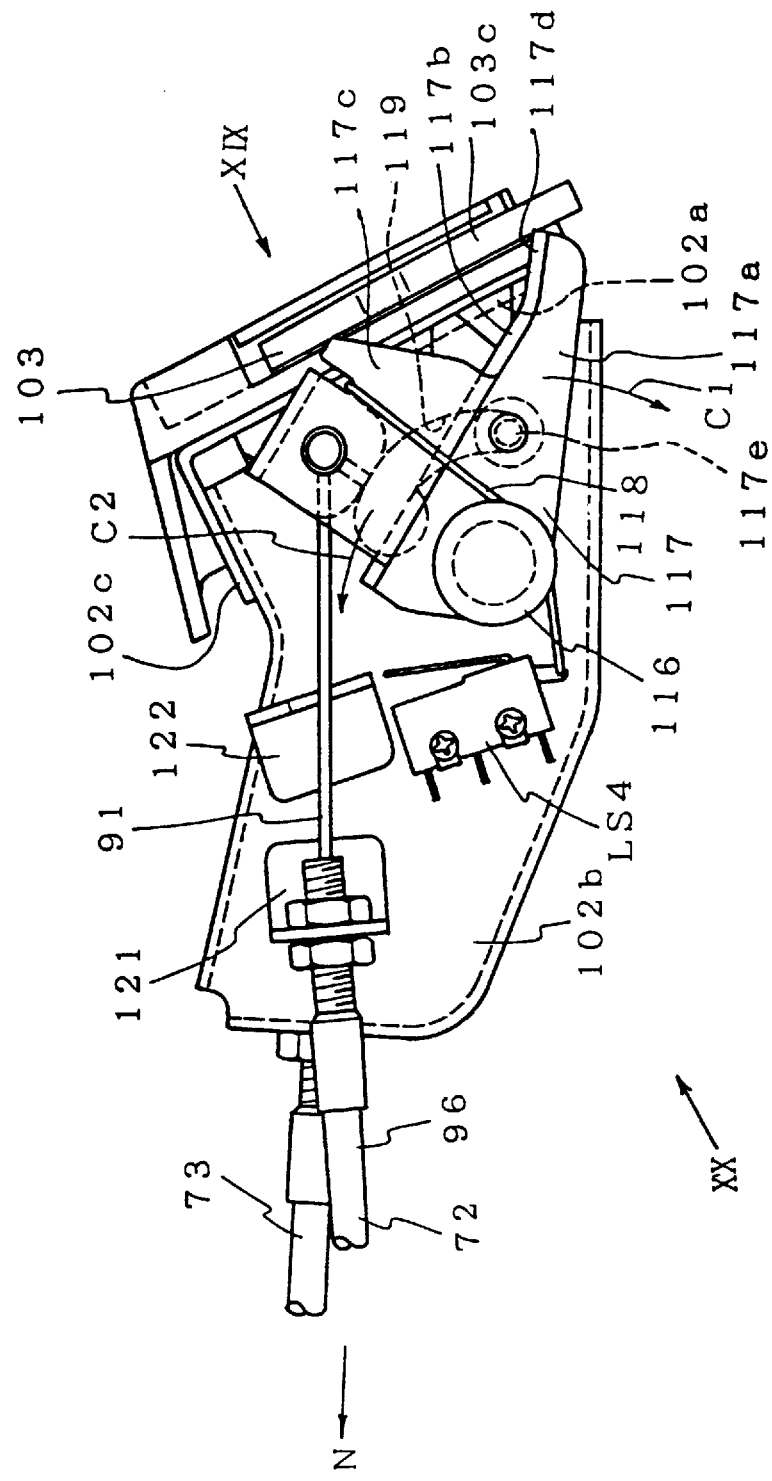
FIG. 18 is a plan view showing the door locking device of FIG. 17.

Beside, in the above-mentioned embodiment, since two levers are arranged with substantially right angle in three-dimensional formation, the opening control cable 73 can be arranged in parallel with the closing control cable 72. Therefore, the two control cables 72, 73 can be easily arranged, for example, in a banded state. Further, as shown in FIG. 18, a latch side face of the housing 101 slants with respect to a plane of the door (the plane along which the door slides). Therefore, the opening control cable 73 and the closing control cable 72 can be arranged along the plane of the door as shown in FIG. 12 to be connected with the cable actuator B1.

Hereinafter, function of the above-mentioned door locking device B2 will be explained. When the closing inner cable 91 in FIG. 18 is pulled in the direction N, the close lever 117 is rotated in the direction C2 with engaging with the finger 103c of the latch 103, so that the latch 103 rotates to the fully latch position m. The free end 109a of the claw 109 is therefore hooked to the engaging portion 103a for fully latch condition of the latch 103. Thereafter, even though the tension of inner cable 91 is released and the close lever 117 returns to the neutral position, the fully latch condition is maintained.

Under the condition, when the inner cable 92 of the opening control cable 73 is pulled in the direction N, the open lever 123 rotates in the direction D1 to rotate the claw 109 through the lever 113 in the direction D3. Then the latch 103 rotates to the open position I by means of the return spring 106. Thereafter, even though the tension of the inner cable 92 is released, the striker 108 fully disengages from the latch 103 and will not engage again, since the door is kept slightly ajar by means of door packing and the like.

The above-mentioned automatic door closer B having a cable actuator B1, a door locking device B2 and opening and closing control cables 72, 73 connecting them is installed in the door 1 as shown in FIG. 11. And the automatic door closer B can be combined with the above-mentioned sliding-door drive device A to obtain a powered sliding-door system.

The controller C in FIG. 12 has not only a control circuit for controlling the motor M of the closing-door drive device A, but also a control circuit for the automatic door closer B. That is, the controller C has a circuit for providing electric current to rotate the motor M2 of the cable actuator B1 in both directions or to stop the motor M2 through cords 12a and 12b, and for controlling the same motor M2 on receiving signal of neutral position from the limit switch LS5 in the cable actuator B1 and signal of latch positions from the limit switches LS3 and LS4 in the door locking device B2.

Figure 21:
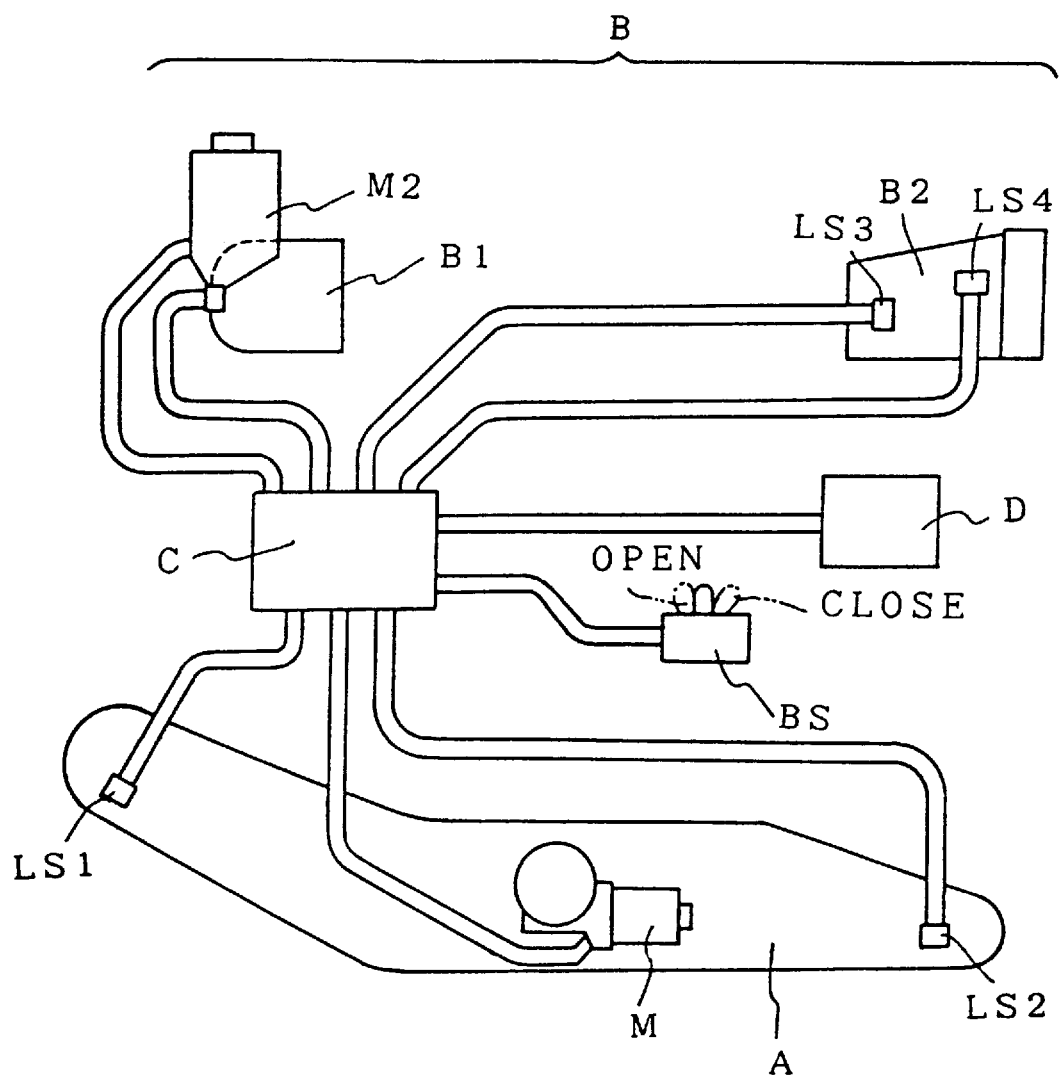
FIG. 21 is a block diagram showing an embodiment of a control circuit in the powered sliding-door system of FIG. 12.
Figure 22:
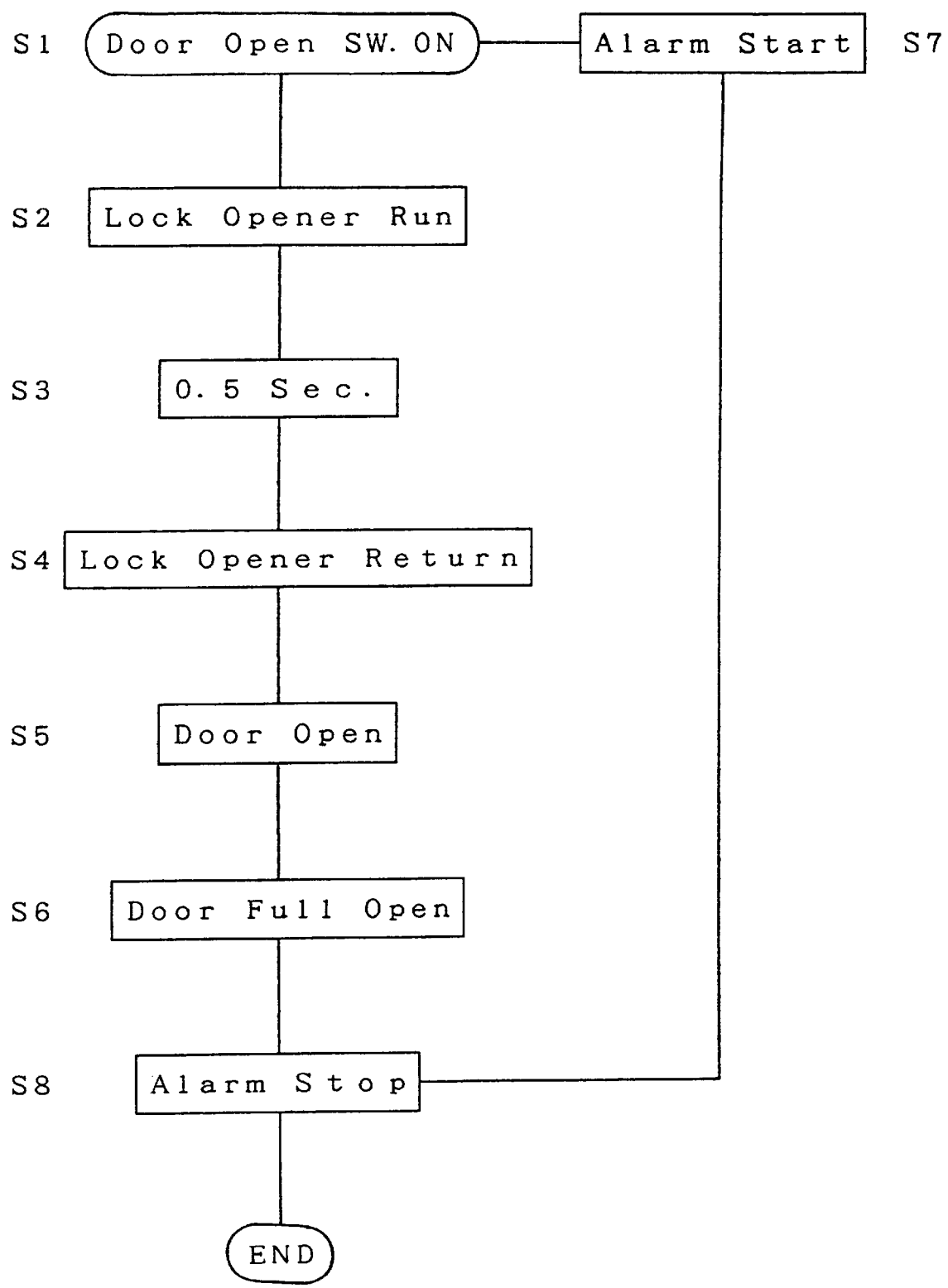
FIG. 22 and FIG. 23 are flow charts showing a motion sequence of the system of FIG. 12.
Figure 23:
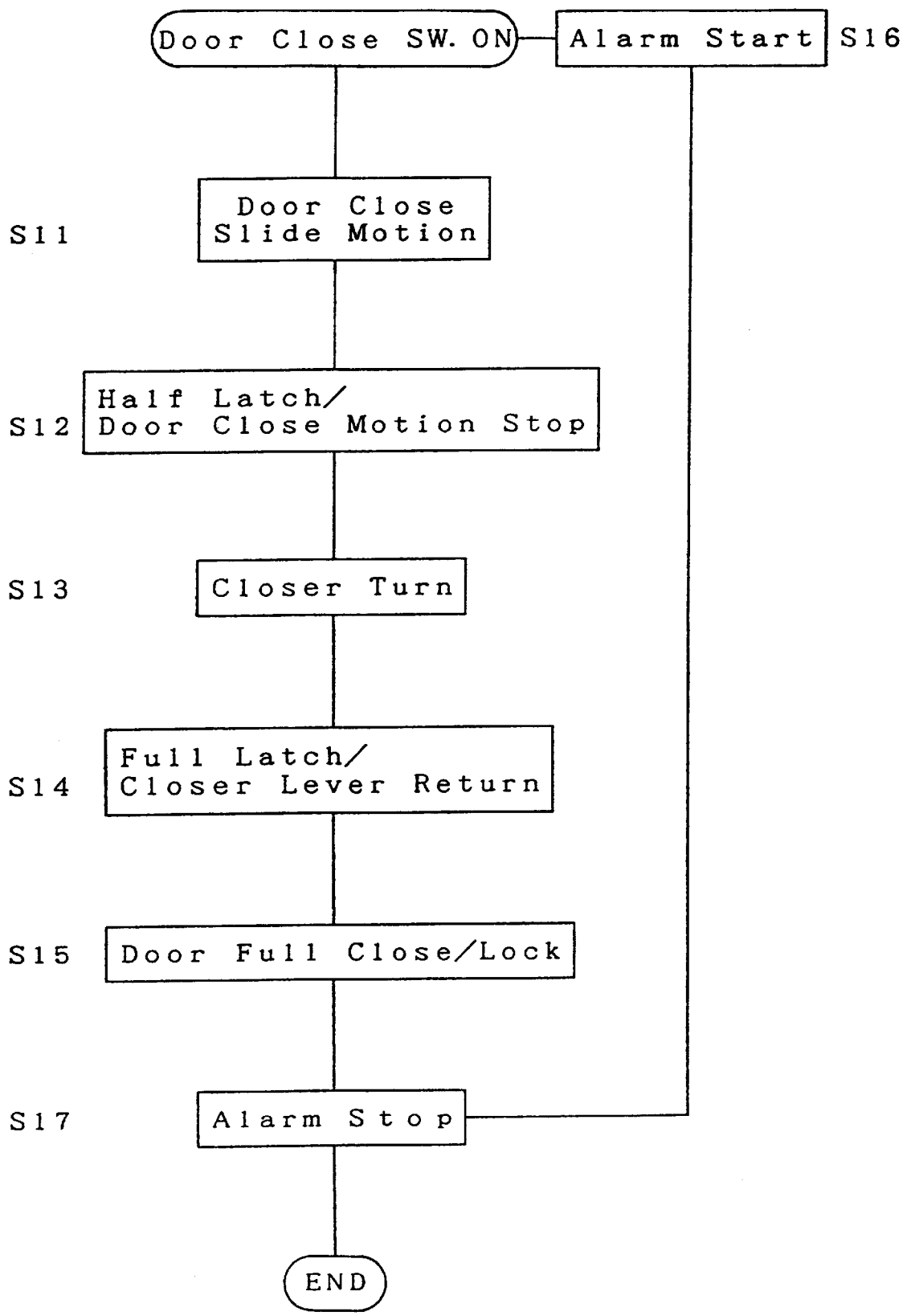

Further, the controller C can sequentially control the sliding-door drive device A and the automatic door closer B. Referring to FIGS. 21 to 23, the sequential operations of the sliding-door drive device A and the automatic door closer B will be explained hereinafter.

Block diagram of FIG. 21 shows control lines of the door operating system of FIG. 12. Controller C receives motion condition signal from the limit switches LS1, LS2 in the sliding-door drive device A and the limit switches LS3, LS4 in the door locking device B2 of the automatic door closer B, receives an order signal from an operation switch BS, and transmits driving signals to the motor M2 in the automatic door closer B and the motor M in the sliding-door drive device A in sequence. Mark D in FIG. 21 denotes a power source.

Door opening motion is shown in FIG. 22. The operation switch BS is turned on (step S1) at first. Then, the the motor M2 in the automatic door closer B rotates so as to serve as a lock-opener, and the open lever in the door locking device B2 starts to release the door lock (step S2). The motion as lock-opener continues about 0.5 seconds (step S3), then the motor M2 rotates in the opposite direction to return the open lever to the original position, and the lock is released (step S4). Further, one second after, for example, or when the limit switch LS3 detects that the lock is released, the motor M in the sliding-door drive device A starts to rotate to open the door (step S5). When the limit switch LS2 detects that the door is fully opened, the motor M stops, and the door opening motion completes (step S6). Beside, alarm or warning chime starts when a door open switch turns on (step S7), in order to call passenger's or another person's attention, and the alarm stops when the door is fully opened (step S8).

Door closing motion is shown in FIG. 23. When the door closing switch is turned on, the motor M in the device A is rotated in the opposite direction to close the door (step S11). Then the limit switch LS1 detects the door closed, and the motor M stops (step S12). In this condition, the striker pulls the latch, and the latch comes to a half latch position (see markII in FIG. 20). Then the limit switch LS4 detects the half latch condition, and the motor M2 in the automatic door closer B rotates in such direction that the automatic door closer B serves as a door closer. That is to say, the closing inner cable is wrapped around the first pulley to provide closing motion (step S13). When the limit switch LS3 detects that the closing lever rotates to the fully latch position, the motor M2 rotates in the opposite direction until the limit switch LS5 detects that the drum comes to normal position, and the close lever returns to neutral position (step S14). Thus, the door is locked into the side panel of the automobile (step S15). Beside, the alarm or warning chime begins to rings (step S16) at the start of closing motion, and stops when the closing motion completes (step S17).

In the control system in FIGS. 21 to 23, a cable driving motor M2 serves for closing motion and opening motion. However, as shown by imaginary lines, an independent actuator P can be used for opening operation. Further, though in the above-mentioned embodiment, a pair of guide pulleys are mounted at the front and rear end portions of the case body, another type of guide members such as a slide guide which guides the inner cable with slide motion can be employed. Further, two-way-clutch is interposed between the reduction gear and the drum in the above-mentioned embodiment, an electromagnetic clutch, for example, can be used.

In the above-mentioned embodiment, an inner cable is inserted through openings in both ends of guide portion, a slit to which the inner cable can be inserted from under side can be employed. In this case, the inner cable can be easily inserted in the guide portion without removing the end-holder from the ends of the inner cables.

Further, if a construction that the end-holder can be attached to the arm of door, is employed, assembling becomes more easy. The above mentioned device can be designed as a device to be built in a door frame previously. However, the device can also be designed as a unit to be attached to a manually operative sliding door later, on user's demand.

Though various preferable embodiments are described above with reference to the attached drawings, the present invention is not limited to the above embodiments, and various changes and modifications can be made without departing from the scope and spirit of the mentioned in the following claims.

What we claim is:

1. A sliding-door drive device comprising:

a base plate extending in a door slide direction and being arranged under a door frame in a substantially horizontal posture;

a pair of guide elements guiding a cable to turn around an axis inclined with respect to the base plate such that the cable which is turned is shifted up or down; and an electrically powered actuator to drive a loop of the cable in both directions, the loop of cable arranged between the pair of guide elements such that a lower portion of the cable extends across a top surface of the base plate and an upper portion of the cable extends across an under surface of the base plate, opposite the top surface, and is in contact with the actuator.

2. The sliding-door drive device of claim 1, wherein:

the actuator is attached to an under surface of the base plate; and the upper portion of the cable is connected to a door.

3. The sliding-door drive device of claim 2, wherein:

the under surface of the base plate is covered with a cover member so as to form a box capable of housing the actuator and the lower portion of the cable.

4. The sliding door drive device of claim 1, wherein:

one of the guide elements is at a position laterally shifted toward an inside of a doorframe to guide the sliding-door with respect to another guide element.

5. The sliding-door drive device of claim 1, wherein:

at least one of the guide elements is a guide pulley.

6. The sliding-door drive device of claim 5, wherein:

a part of the guide pulley is projected upward from an upper surface of the base plate; and another part of the guide pulley is projected downward from the under surface of the base plate.

7. The sliding-door drive device of claim 1, wherein:

the electrically powered actuator has an electric motor, a reduction gear, a drum for winding and rewinding the cable and a two-way-clutch interposed between the reduction gear and the drum; said two-way-clutch being capable of transmitting torque to the drum in both directions mechanically and allowing free rotation of the drum.

* * * * *

UNITED STATES PATENT AND TRADEMARK OFFICE
CERTIFICATE OF CORRECTION

PATENT NO. : 5,806,246
DATED : September 15, 1998
INVENTOR(S) : Chiharu AZUMA

It is certified that error appears in the above-indentified patent and that said Letters Patent is hereby corrected as shown below:

Column 2, lines 36-37, change "large space, and can be" to --large space, can be--;

column 3, line 25, change "the device unit can be" to --the device can be--; and claim 4, line 1, change "The sliding door" to --The sliding-door--.

Signed and Sealed this

Second Day of March, 1999

*Attest:*

Q. TODD DICKINSON

*Attesting Officer*     *Acting Commissioner of Patents and Trademarks*